United States Patent
Sood et al.

(10) Patent No.: US 10,528,721 B2
(45) Date of Patent: *Jan. 7, 2020

(54) TRUSTED PACKET PROCESSING FOR MULTI-DOMAIN SEPARATIZATION AND SECURITY

(71) Applicant: INTEL CORPORATION, Santa Clara, CA (US)

(72) Inventors: Kapil Sood, Beaverton, OR (US); Somnath Chakrabarti, Portland, OR (US); Wei Shen, Hillsboro, OR (US); Carlos V. Rozas, Portland, OR (US); Mona Vij, Hillsboro, OR (US); Vincent R. Scarlata, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 15/298,416

(22) Filed: Oct. 20, 2016

(65) Prior Publication Data

US 2018/0114012 A1 Apr. 26, 2018

(51) Int. Cl.
*G06F 21/53* (2013.01)
*G06F 9/4401* (2018.01)
(Continued)

(52) U.S. Cl.
CPC .......... *G06F 21/53* (2013.01); *G06F 9/4406* (2013.01); *G06F 9/45558* (2013.01);
(Continued)

(58) Field of Classification Search
CPC .......... G06F 2009/45587; G06F 21/53; G06F 21/575; G06F 21/602; G06F 8/61; G06F 9/4406; G06F 9/45558
See application file for complete search history.

(56) References Cited

U.S. PATENT DOCUMENTS

| | | | |
|---|---|---|---|
| 9,584,517 B1 * | 2/2017 | Roth | H04L 63/10 |
| 2014/0258733 A1 * | 9/2014 | Scott-Nash | G06F 12/1408 713/190 |
| 2016/0364723 A1 * | 12/2016 | Reese | G06Q 20/38215 |

* cited by examiner

*Primary Examiner* — Terrell S Johnson
(74) *Attorney, Agent, or Firm* — Law Office of R. Alan Burnett, P.S.

(57) ABSTRACT

Methods and apparatus for implemented trusted packet processing for multi-domain separatization and security. Secure enclaves are created in system memory of a compute platform configured to support a virtualized execution environment including a plurality of virtual machines (VMs) or containers, each secure enclave occupying a respective protected portion of the system memory, wherein software code external from a secure enclave cannot access code or data within a secure enclave, and software code in a secure enclave can access code and data both within the secure enclave and external to the secure enclave. Software code for implementing packet processing operations is installed in the secure enclaves. The software in the secure enclaves is then executed to perform the packet processing operations. Various configurations of secure enclaves and software code may be implemented, including configurations supporting service chains both within a VM or contain or across multiple VMs or containers, as well a parallel packet processing operations.

21 Claims, 23 Drawing Sheets

(51) Int. Cl.
*G06F 9/455* (2018.01)
*G06F 21/79* (2013.01)
*G06F 12/1036* (2016.01)
*G06F 12/109* (2016.01)
*G06F 12/14* (2006.01)
*G06F 21/57* (2013.01)
*G06F 8/61* (2018.01)
*H04L 12/24* (2006.01)

(52) U.S. Cl.
CPC ........ *G06F 12/109* (2013.01); *G06F 12/1036* (2013.01); *G06F 12/1425* (2013.01); *G06F 21/79* (2013.01); *G06F 8/61* (2013.01); *G06F 21/575* (2013.01); *G06F 2009/45587* (2013.01); *G06F 2212/1052* (2013.01); *H04L 41/5041* (2013.01)

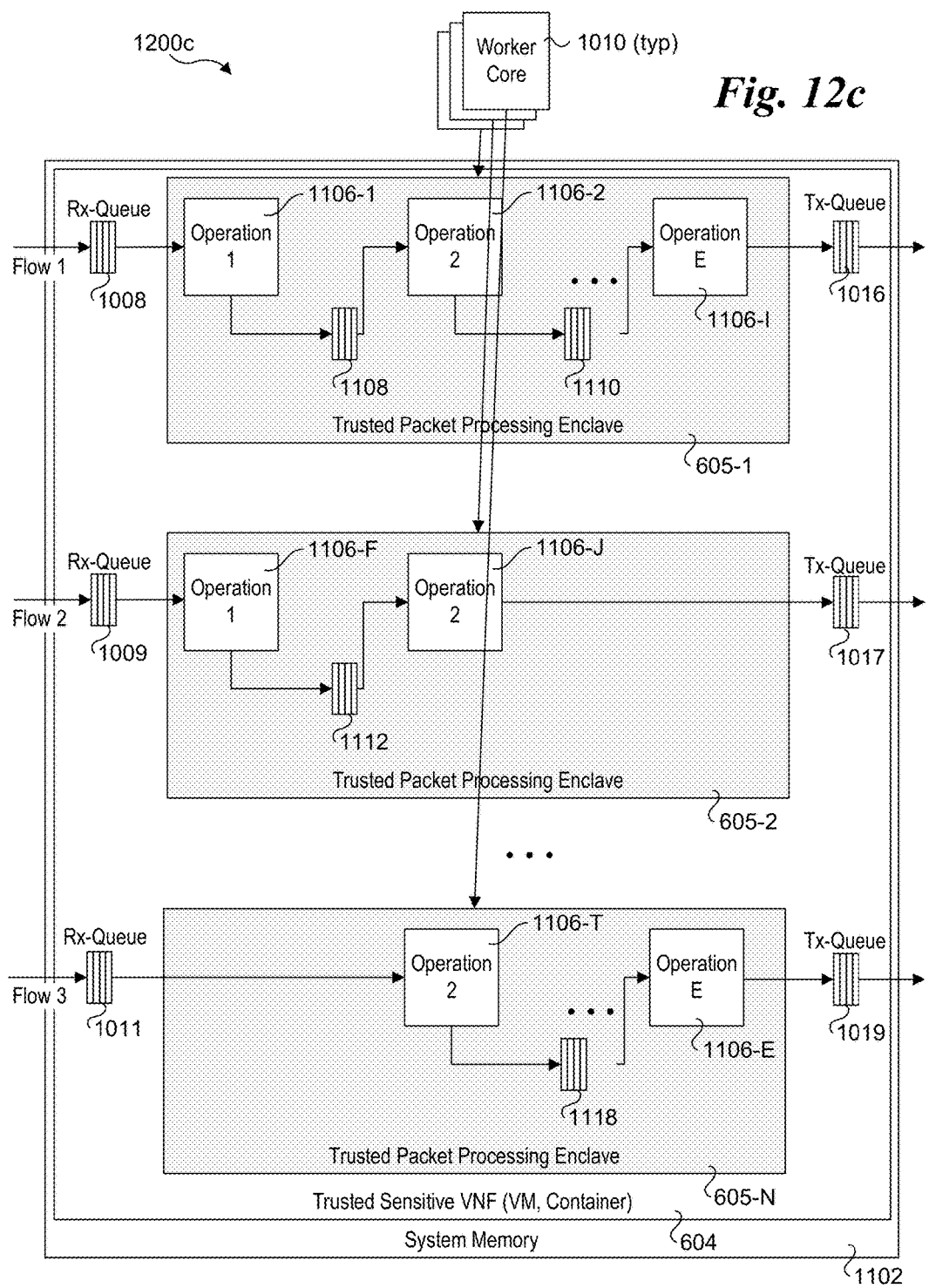

TRUSTED PACKET PROCESSING FOR MULTI-DOMAIN SEPARATIZATION AND SECURITY

BACKGROUND INFORMATION

During the past decade, there has been tremendous growth in the usage of so-called "cloud-hosted" services. Examples of such services include e-mail services provided by Microsoft (Hotmail/Outlook online), Google (Gmail) and Yahoo (Yahoo mail), productivity applications such as Microsoft Office 365 and Google Docs, and Web service platforms such as Amazon Web Services (AWS) and Elastic Compute Cloud (EC2) and Microsoft Azure. Cloud-hosted services are typically implemented using data centers that have a very large number of compute resources, implemented in racks of various types of servers, such as blade servers filled with server blades and/or modules and other types of server configurations (e.g., 1U, 2U, and 4U servers).

In recent years, virtualization of computer systems has seen rapid growth, particularly in server deployments and data centers. Under a conventional approach, a server runs a single instance of an operating system directly on physical hardware resources, such as the CPU, RAM, storage devices (e.g., hard disk), network controllers, I/O ports, etc. Under one virtualized approach using Virtual Machines (VMs), the physical hardware resources are employed to support corresponding instances of virtual resources, such that multiple VMs may run on the server's physical hardware resources, wherein each virtual machine includes its own CPU allocation, memory allocation, storage devices, network controllers, I/O ports etc. Multiple instances of the same or different operating systems then run on the multiple VMs. Moreover, through use of a virtual machine manager (VMM) or "hypervisor," the virtual resources can be dynamically allocated while the server is running, enabling VM instances to be added, shut down, or repurposed without requiring the server to be shut down. This provides greater flexibility for server utilization, and better use of server processing resources, especially for multi-core processors and/or multi-processor servers.

Under another virtualization approach, container-based OS virtualization is used that employs virtualized "containers" without use of a VMM or hypervisor. Instead of hosting separate instances of operating systems on respective VMs, container-based OS virtualization shares a single OS kernel across multiple containers, with separate instances of system and software libraries for each container. As with VMs, there are also virtual resources allocated to each container.

Deployment of Software Defined Networking (SDN) and Network Function Virtualization (NFV) has also seen rapid growth in the past few years. Under SDN, the system that makes decisions about where traffic is sent (the control plane) is decoupled for the underlying system that forwards traffic to the selected destination (the data plane). SDN concepts may be employed to facilitate network virtualization, enabling service providers to manage various aspects of their network services via software applications and APIs (Application Program Interfaces). Under NFV, by virtualizing network functions as software applications, network service providers can gain flexibility in network configuration, enabling significant benefits including optimization of available bandwidth, cost savings, and faster time to market for new services.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 12b is a diagram illustrating a packet processing flow including a service chain of operations that includes operations executed in multiple trusted packet processing enclaves implemented in a single VNF, wherein the service chain skips several operations included in the service chain of FIG. 12a;

FIG. 12c is a diagram illustrating multiple packet processing flows implemented in parallel using respective service chains executed in respective trusted packet processing enclaves implemented in a single VNF;

DETAILED DESCRIPTION

Figure 1:
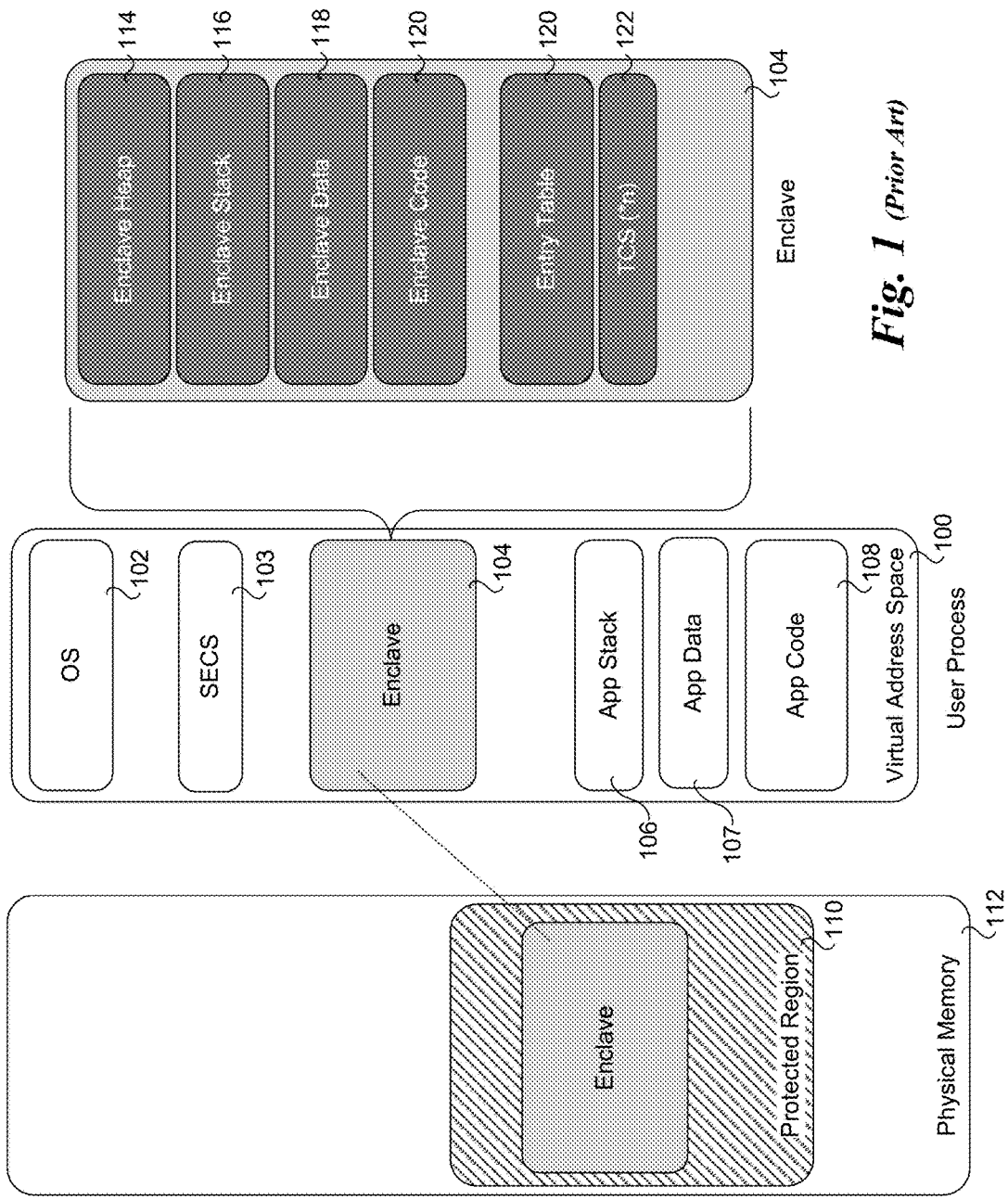
FIG. 1 is a schematic diagram illustrating the location of a secure enclave in physical and virtual memory, and an exemplary set of components for a secure enclave.

Embodiments of methods and apparatus to trusted packet processing for multi-domain separatization and security are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Recently, INTEL® Corporation published documents describing the INTEL® Software Guard Extensions (INTEL® SGX), a set of instructions and mechanisms for memory accesses added to future INTEL® Architecture processors. INTEL® SGX can encompass two collections of instruction extensions, referred to as SGX1 and SGX2. The SGX1 extensions allow an application to instantiate a protected container, referred to as an enclave.

An enclave is a protected area in the application's address space (see FIG. 1), which provides confidentiality and integrity even in the presence of privileged malware. Accesses to the enclave memory area from any software not resident in the enclave are prevented. The SGX2 extensions allow additional flexibility in runtime management of enclave resources and thread execution within an enclave.

SGX when used in a server environment is a technology that is aimed at ensuring that users' applications hosted in the cloud are secure from inspection, corruption, etc. In order to have a better understanding of the implementation environments, a brief discussion of selected SGX features and architecture is now discussed.

SGX allows the protected portion of an application to be distributed in the clear. Before the enclave is built, the enclave code and data is free for inspection and analysis. During enclave creation, the enclave code and data is loaded from a clear-text source into an enclave where its code and data is measured. Code and data from an encrypted source may be installed into an enclave by first loading a trusted loader into the enclave. Once the enclave is running, the loader can then be used to install secret code/data into the enclave.

The SGX programming environment is a trusted execution environment embedded in a process. Once the application's code and data is loaded into an enclave, it is protected against all external software access. Each enclave has its own code and data for which the SGX programming environment provides confidentiality and integrity. The SGX programming environment further supports controlled entry points, and multiple execution threads, with full access to application memory, including any portion of application memory that is external to an enclave An application can prove its identity to a remote party and be securely provisioned with keys and credentials using attestation. The application can also request an enclave and platform-specific key that it can use to protect keys and data that it wishes to store outside the enclave.

FIG. 1 shows a memory layout of a platform's virtual address space 100 including an operating system (OS) 102, an enclave 104, a Secure Enclave Control Structure (SECS) 105, an application stack 106, application data 107, and application code 108. The enclave 104 virtual memory is mapped to a protected area 110 of physical memory 112. Enclave 104 is further depicted as including an enclave heap 114, an enclave stack 116, enclave data 118, enclave code 120, an entry table 120, and a set of pointers to Thread Control Structure pages (TCS(*n)) 122.

Figure 2:
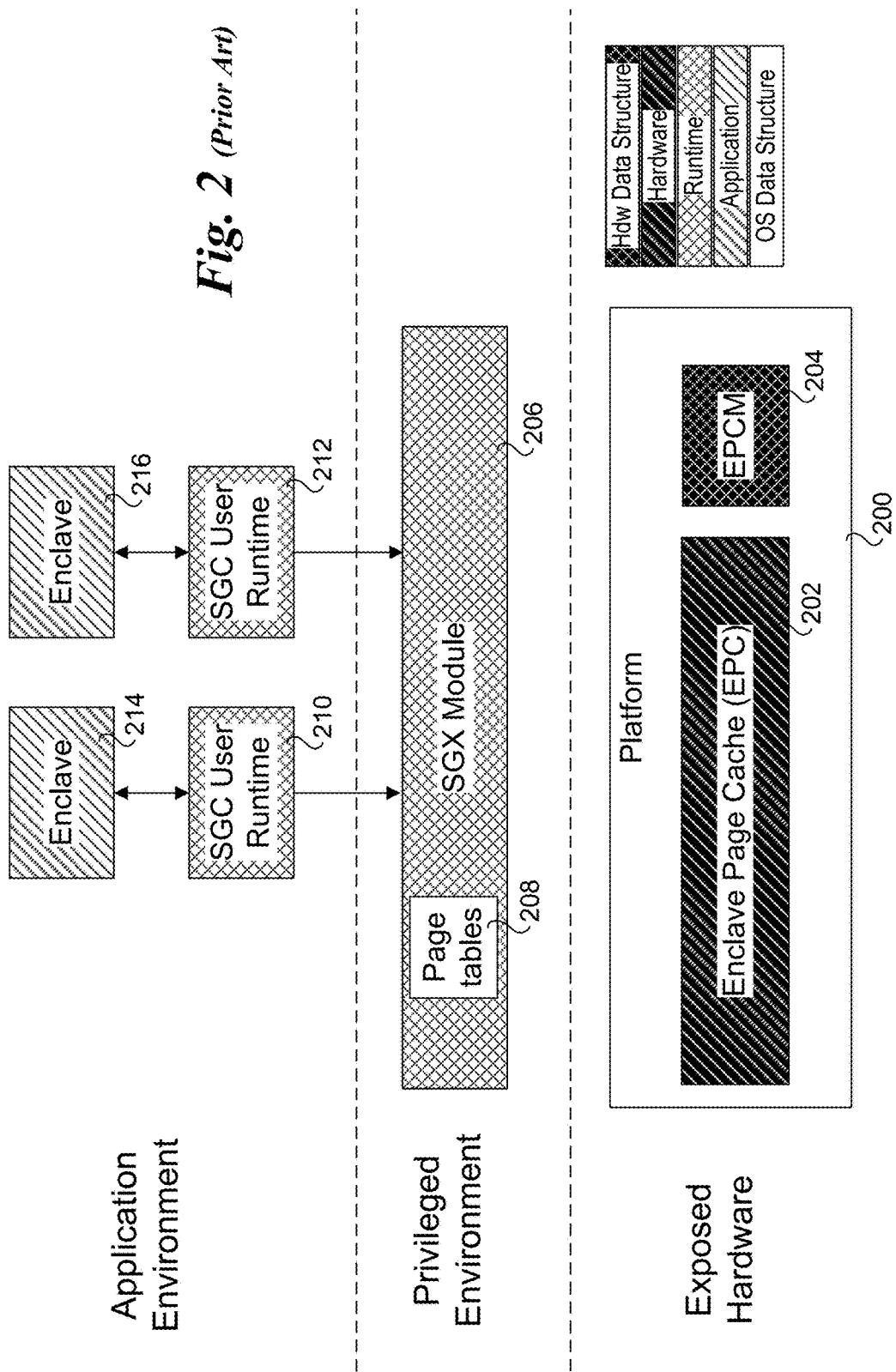
FIG. 2 is a schematic diagram illustrating a high-level SGX hardware and software architecture.

FIG. 2 shows a high-level SGX hardware and software architecture. The architecture includes an exposed hardware layer, a privileged environment layer, and an application environment layer. The exposed hardware on a platform 200 includes an Enclave Page Cache (EPC) 202, and an Enclave Page Cache Map (EPCM) 204. In one embodiment, EPC 202 contains protected code and data in 4K pages, while EPCM 204 contains meta-data for each enclave page. An SGX module 206 comprising a runtime component is depicted in the privileged environment layer, and includes page tables 208 that are implemented via corresponding page table data structures in the OS. The application environment layer includes SGC user runtime instances 210 and 212, and enclaves 214 and 216.

At a high level, a CPU that supports SGX and implements EPC in cryptographically protected platform DRAM supports the ability for the BIOS to reserve a range(s) of memory called Processor Reserved Memory (PRM). The BIOS allocates the PRM by configuring a set of range registers, collectively known as the PRMRR.

Use of main memory as storage for the EPC is very desirable for many implementations. The challenge is there are many known software and hardware attacks that can be waged on DRAM memory. Cryptographically protecting the EPC contents in DRAM is one way to defend against these attacks.

This is facilitated by a Memory Encryption Engine (MEE), which is a hardware unit that encrypts and integrity protects selected traffic between the processor package and the main memory (DRAM). The overall memory region that an MEE operates on is called an MEE Region. Depending on implementation, the PRM is covered by one or more MEE regions. Memory Access Semantics CPU memory protection mechanisms physically block access to PRM from all external agents (DMA, graphic engine, etc.), by treating such accesses as references to nonexistent memory. To access a page inside an enclave using MOV and other memory related instructions, the hardware checks as described in FIG. 3, the following:

Logical processor is executing in "enclave mode"
Page belongs to enclave that the logical processor is executing
Page accessed using the correct virtual address If the accessed page is not part of the enclave's virtual address space but is part of the EPC then the access is treated as a reference to nonexistent memory. If the page is outside of the enclave virtual address space, then hardware allows the enclave code to access the memory outside of PRM. If the page is outside of the enclave's virtual address space and resolves into a PRM page, hardware prevents such access by signaling a fault. Accesses by a processor not in enclave mode to an enclave page are treated as a reference to nonexistent memory.

Figure 3:
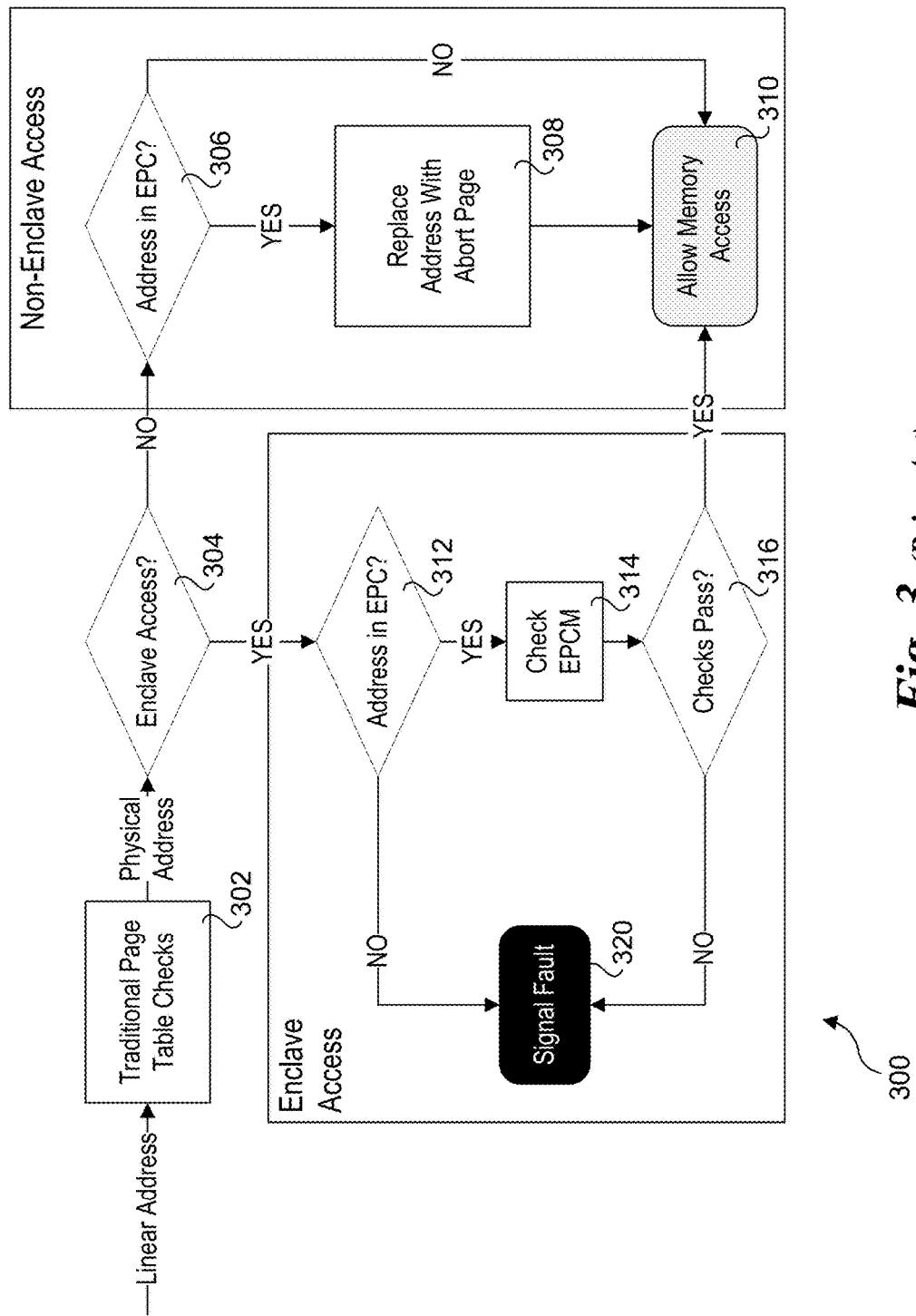
FIG. 3 is a flowchart illustrating operations and logic relating to enclave and non-enclave memory accesses.

FIG. 3 shows a flowchart 300 illustrating operations and logic relating to enclave and non-enclave memory accesses. In a block 302 a linear memory address is received and traditional page table checks are performed, resulting in an output physical address. In a decision block 304 a determination is made to whether the physical address corresponds to an enclave access (e.g., the physical address corresponds to a region in physical memory allocated for an enclave). If the answer is NO, the access is a non-enclave access, and the logic proceeds to a decision block 306 in which a determination is made to whether the address is an Enclave Page Cache. Since it shouldn't be (for a non-enclave access), if the answer is YES the logic proceeds to a block 308 in which the address is replaced with an abort page. If the answer to decision block 306 is NO, this is a conventional memory access, which is allowed in a block 310.

Returning to decision block 304, if the memory access is an enclave access the answer is YES, and the logic proceeds to a decision block 312 in which a determination is made to whether the address is an Enclave Page Cache. If the answer is YES, an EPCM check is performed in a block 314, and if the checks pass, as depicted by a decision block 316, the logic proceeds to block 310, thus allowing the memory access. If the answer to either decision block 312 or 316 is NO, the logic proceeds to a signal fault block 320, which signals a memory access fault.

Figure 4:
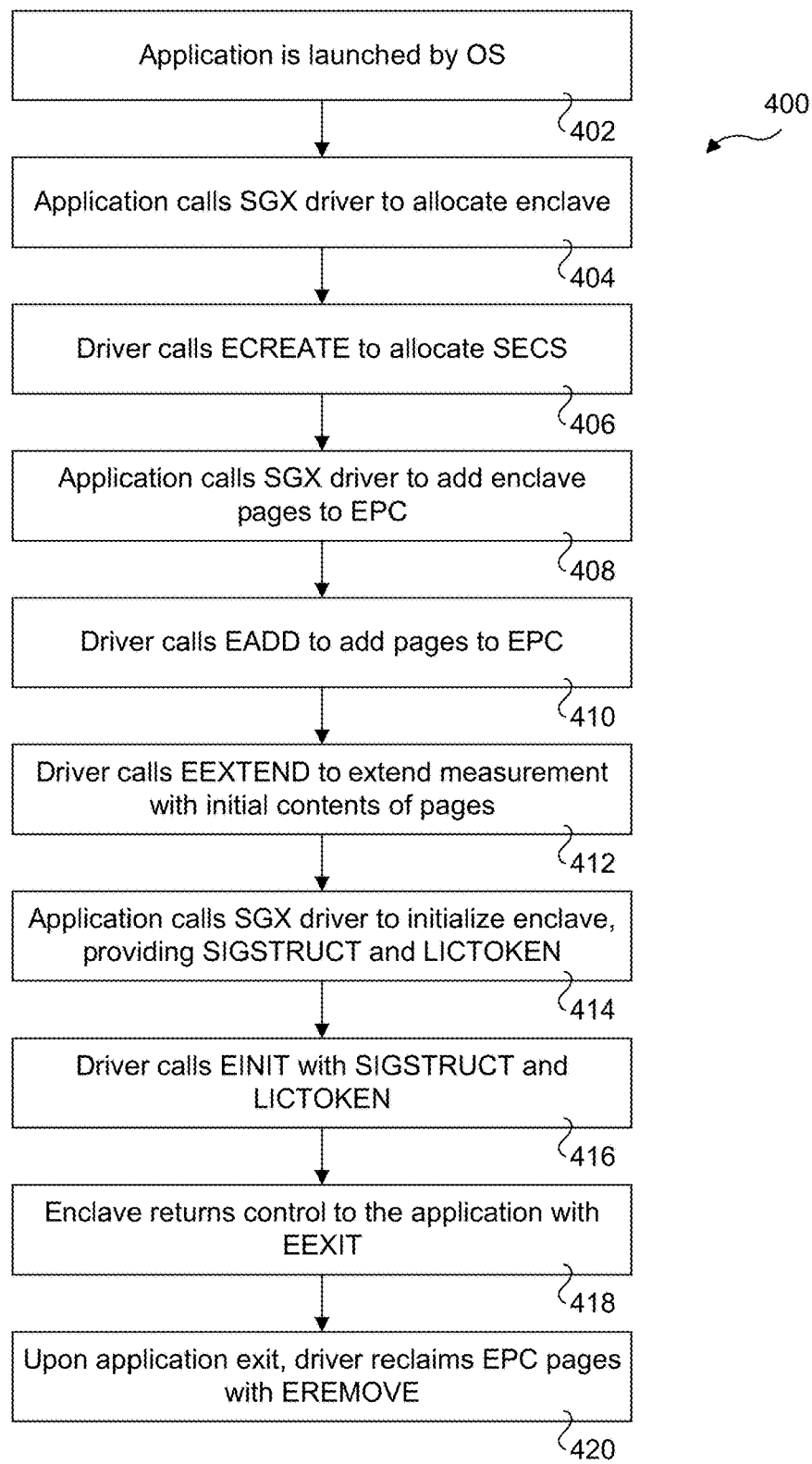
FIG. 4 is a flowchart illustrating operations performed during the lifecycle of a secure enclave.
Figure 5:
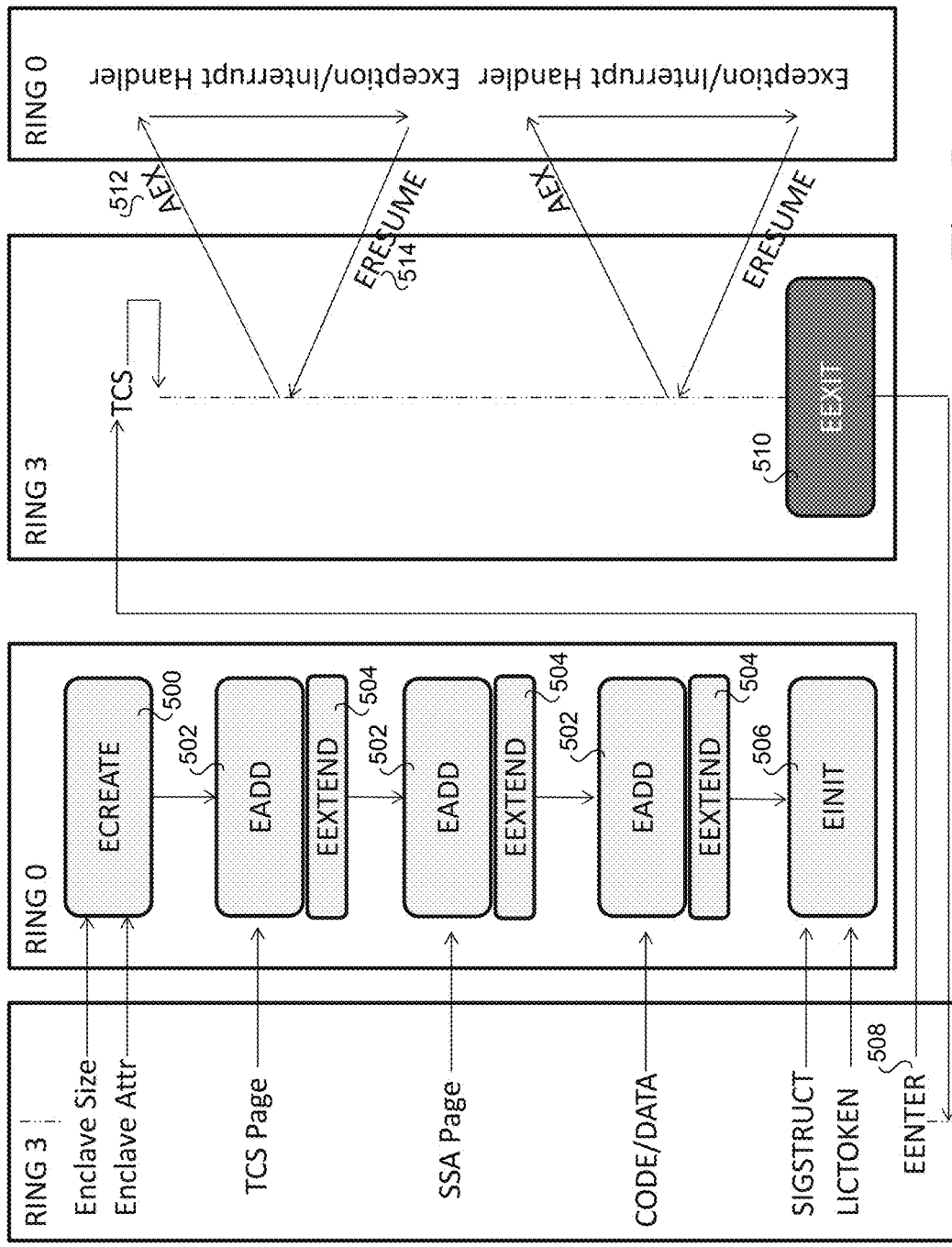
FIG. 5 is a diagram illustrating instructions and code executed in Ring 0 and Ring 3 during the lifecycle of a secure enclave.

Flowchart 400 of FIG. 4 illustrates operations performed during the lifetime of an SGX secure enclave, while corresponding events are schematically depicted in FIG. 5. The process starts in a block 402, wherein the application (to employ the secure enclave) is launched by the operating system (OS). In a block 404, the application calls the SGX driver to allocate an enclave. In response, in a block 406 the SGX driver calls an ECREATE instruction to allocate SECS. The ECREATE instruction creates a unique instance of an enclave, establishes the linear address range, and serves as the enclave's root of trust. This information stored within an SECS generated by ECREATE.

Next, the application calls the SGX driver to add enclave pages to EPC, as shown in a block 408, and the driver calls an EADD instruction to add pages to the EPC, as shown in a block 410. The EADD instruction is used to add Regular (REG) or Thread Control Structure (TCS) pages into the enclave. The system software is responsible for selecting a free EPC page, type, and attributes, content of the page and the enclave to which the page added to. The EADD instruction further generates an initial EPCM entry to indicate type of page (REG, TCS), and a linear address, RWX, associating the page to the enclave SECS.

In a block 412, the SGX driver calls an EEXTEND instruction to extend the measurement with the initial contents of the pages. In one embodiment, the EEXTEND instructions generates a cryptographic hash of the content of the enclave in 256 Byte chunks. EEXTEND is executed 16 times for measuring a 4K page.

The application then calls the SGX driver to initialize enclave, providing a signature data structure (SIGSTRUCT) and a license token (LICTOKEN), as shown in a block 414. In a block 416, the driver calls an EINIT instruction with SIGSTRUCT and LICTOKEN as arguments. The EINIT instruction verifies the enclave's content against the ISV's signed SIGSTRUCT and initializes the enclave, marking it ready to be used. It also Validate SIGSTRUCT is signed using SIGSTRUCT public key, verifies the enclave measurement matches the measurement specified in SIGSTRUCT, verifies the enclave attributes are compatible with SIGSTRUCT, and record the sealing identity (sealing authority, product id, SVN) in the SECS.

The application then enters the enclave with an EENTER instruction, as shown in a block 418. The EENTER instruction checks that the TCS is not busy and flushes TLB entries for enclave addresses, transfers control from outside enclave to pre-determined location inside the enclave, and change the mode of operation to be in enclave mode. [I intentionally left out the other details—we don't need them].

At this point the enclave is ready for use by the application. Subsequently, an application will either exit the enclave on its own (e.g., in response to a user or automated control input to exit the enclave), or in connection with shutting down the application. This is depicted in a block 418, wherein the enclave returns control to the application with an EEXIT instruction. The EEXIT instruction clears the enclave mode and TLB entries for enclave addresses, transfers control from inside enclave to a location outside specified by RBX [what is this? (I presume some register)], and marks the TCS as not busy. The responsibility to clear register state is on enclave writer (the runtime system).

Upon application exit, the driver reclaims EPC pages with an EREMOVE instruction, as depicted in a block 420.

As shown in FIG. 5, in the illustrated embodiment each of an ECREATE instruction 500, an EADD instruction 502, an EEXTEND instruction 504 and an EINIT instruction 506 are executed in RING 0, which corresponds the highest privilege level of the host processor (also referred to as kernel mode). Meanwhile, an EENTER instruction 508 and an EEXIT instruction 510 are executed in RING 3, which is used for user-level software (also referred to as user mode).

Enclave Entry and Exiting

Critical to preserving the integrity of an enclave is to control transfer of execution into and out of an enclave. The entry process needs to clear any cached translations that overlap with the enclave's protected address region. This ensures that all protected enclave memory accesses are properly checked. The entry process must identify where inside the enclave the processor should transfer control and enable enclave mode of execution. Exiting an enclave must again clear any cached translations referring to the enclave's protected address region so that no other software can use the cached translations to access the enclave's protected memory.

While operating in enclave mode, an interrupt, fault or exception may occur. Traditionally, the processor would vector to a fault handler specified by system software. The fault handler saves the register state and services the event. Once the event has been serviced, system software restores the register state and returns control to where software was interrupted. Allowing system software to read and/or modify the register state of an enclave places system software within the trust boundary of the enclave. Consequently, SGX introduces a new routine to protect the integrity and confidentiality of the enclave.

SGX offers the EENTER and EEXIT instructions to enter and exit an enclave programmatically (e.g. as part of call/return sequence). When enclave exit occurs due to an event, the processor invokes a special internal routine called Asynchronous Exit (AEX) which saves the enclave register state, clears the registers, sets the faulting instruction address to a value specified by EENTER. The ERESUME instruction restores the state back to allow the enclave to resume execution.

The EENTER instruction is the method to enter the enclave under program control. To execute EENTER, software must supply an address of a TCS that is part of the enclave to be entered. The TCS indicates the location inside the enclave to transfer control and where inside the enclave AEX should store the register state. When a logical processor enters an enclave, the TCS is considered busy until the logical processors exits the enclave. SGX allows an enclave builder to define multiple TCS structures, thereby providing support for multithreaded enclaves.

EENTER also defines the Asynchronous Exit Pointer (AEP) parameter. AEP is an address external to the enclave which is used to transition back into the enclave after an AEX. The AEP is the address an exception handler will return to using IRET. Typically the location would contain the ERESUME instruction. ERESUME transfers control to the enclave address retrieved from the enclave saved state.

Asynchronous events, such as exceptions and interrupts may occur during execution inside an enclave. These events are referred to as Enclave Exiting Events (EEE). Upon an EEE, the processor state is securely saved inside the enclave and then replaced by a synthetic state to prevent leakage of secrets. The process of securely saving state and establishing the synthetic state is performed by the AEX routine.

As part of the EEE the AEP is pushed onto the stack as the location of the faulting address. This is the location where control will return after executing the IRET (Interrupt Return instruction). The ERESUME can be executed from that point to reenter the enclave.

After AEX has completed, the logical processor is no longer in enclave mode and the exiting event is processed normally. Any new events that occur after the AEX has completed are treated as having occurred outside the enclave.

After system software has serviced the event that caused the logical process to exit an enclave, the logical processor can re-start execution using ERESUME. Unlike EENTER, ERESUME restores registers and returns control to where execution was interrupted. If the cause of the exit was an exception or a fault and was not resolved, then the event will be triggered again. For example, if an enclave performs a divide by 0 operation, executing ERESUME will cause the enclave to attempt to re-execute the faulting instruction. In order to handle an exception that occurred inside the enclave, software should enter the enclave at a different location and invoke an exception handler, the EENTER instruction should be used. The exception handler can attempt to resolve the faulting condition or simply return and indicate to software that the enclave should be terminated.

Returning to FIG. 5, in response to an interrupt, fault or exception the AEX routine is invoked, and the enclave register state is stored in the enclave's active State Save Area (SSA). Each enclave thread has a dedicated SSA frame entry that is pre-defined by the Independent Software Vendor (ISV) for that thread. The instruction pointer is initialized to an area referred to as the trampoline code. This code launches an appropriate interrupt handler used to handle the fault, exception, or interrupt, which is executed in RING 0. After the interrupt handler is completed, an ERESUME instruction 514 is executed, returning execution to the application running in RING 3.

Figure 6:
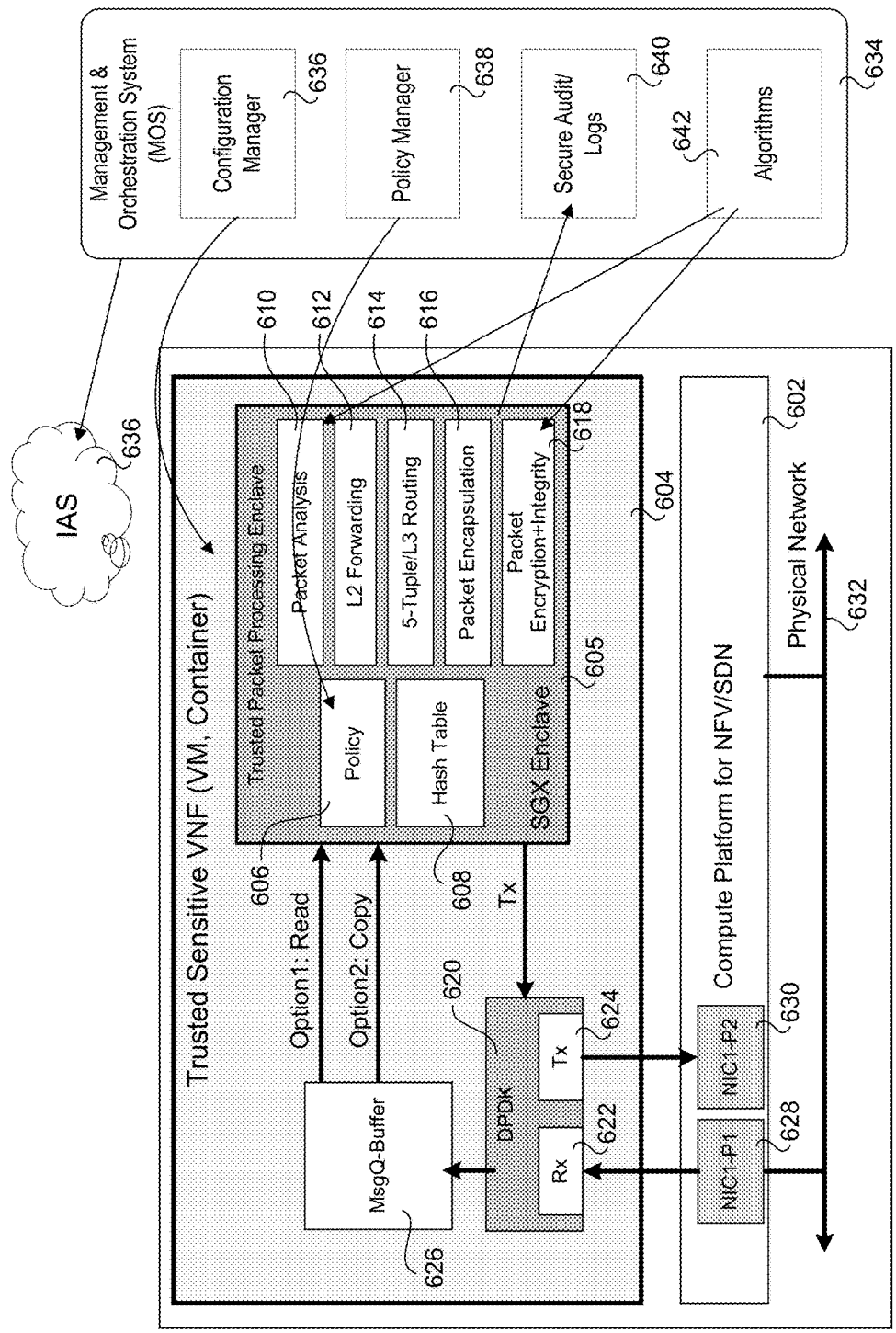
FIG. 6 is a schematic diagram illustrating an embodiment of an NFV SGX architecture in which a trusted packet processing enclave is employed for executing packet processing code provided by a management and orchestration system (MOS)

FIG. 6 shows one embodiment of an NFV SGX Architecture 600. The architecture includes a compute platform 602 configured to support NFV and SDN functionality through virtualization, running VMs or containers. A trusted sensitive VNF 604 is implemented using various software libraries and code running on one of the VMs or containers.

In further detail, the software libraries and code include software that is running in a user space portion of the platform's system memory, where the execution environment includes a secure enclave 606 that is implemented as a trusted packet processing enclave. Generally, a trusted packet processing enclave may be used to securely implement various software-based packet-processing functions. An exemplary set of functional blocks are depicted in enclave 605, including a policy block 606, a hash table 608, a packet analysis block 610, an Layer-2 (L2) forwarding block 612, a 5-tuple/Layer-3 (L3) routing block 614, a packet encapsulation block 616 and a packet encryption plus integrity block 618. It will be understood by those having skill in the art that the packet processing components and functional blocks illustrated herein exemplary and non-limiting, as a myriad of different types of packet processing software components and functional blocks may be implemented within a trusted packet processing enclave in a manner similar to that described for the embodiments discussed herein.

Software components that are show external to secure enclave 606 are run in a non-protected region of the platform's user space (e.g., in the conventional manner employed for user applications). These software components include an INTEL® Data Plane Development Kit (DPDK) library 620, including a receiver (Rx) queue 622 and a transmit (Tx) queue 624, and a message queue-buffer 626.

In addition to the components implemented by NFV SGX Architecture 600, FIG. 6 further depicts a Management and Orchestration System (MOS) 634 and an Intel Attestation Service (IAS) 636. MOS 634, also referred to as a relying party, includes a configuration manager 636, a policy manager 638, a secure audit/logs block 640, and an algorithms block 642.

As discussed above, trusted sensitive VNF runs in a VM or container that is hosted by compute platform 602. Generally, compute platform 602 may comprise any type of computer platform that includes physical resources suitable for hosting VMs and/or containers configured to support NFV and SDN. These include, but are not limited to, servers, including standalone servers (single and multi-processor), server blades, server modules, and other compute platform configurations suitable for supporting NFV and SDN. In addition to a processor and memory (not shown), compute platform 602 will include one or more network interfaces, such as a network adaptor (e.g., network card, host bus adaptor, etc.) or Network Interface Controller (NIC), either implemented as chip or an expansion card (e.g., PCIe card). For example, the embodiment in FIG. 6 includes a pair of NIC ports 628 and 630, coupled to a physical network 632 such as an Ethernet network, InfiniBand network, or one of various other types of networks that may be implemented in a data center or the like. Generally, a given network adaptor or NIC may be configured to support one or more ports, while a given compute platform may include one or more network adaptors or NICs.

A typical packet flow processing path under NFV SGX Architecture 600 proceeds as follows. Packets are received from physical network 632 at NIC port 628 and forwarded to Rx queue 622 in DPDK 620. Depending on the NIC configuration, the packets may be copied from a packet buffer (not shown) in NIC port 628 using various transfer mechanisms, such as a direct memory access (DMA) transfer that copies packets from NIC packet buffers to buffers or queues in system memory without requiring any processor involvement. In one embodiment, a memory mapped input-output (MMIO) addressing scheme is used to implement DMA transfers between memory buffers on NIC ports and memory buffers/queues in system memory.

Once a packet is enqueued in Rx queue 622, it is forwarded to message queue-buffer 626. Message queue-buffer 626 is a message queue and/or buffer that is allocated in a portion of user space for trusted sensitive VNF 604. As discussed above, an entity external to a secure enclave cannot access data within a secure enclave, but software running in a secure enclave can access data external to the secure enclave. In this instance, the packet processing performed in secure enclave 605 implements a pull model under which a software entity (not specifically shown) in enclave 604 pulls packets from message queue/buffer 626.

All or a portion of a packet may either be read (option 1) or copied (option 2) from message queue/buffer 626 into secure enclave 605. For example, some packet processing operations only operate on packet header data, and schemes may be implemented under which packet header data is processed and the packet header is subsequently re-unioned with its packet payload data; thus, only the packet header needs to be read or copied into trusted packet processing enclave 605.

Depending on the particular set of packet processing functions to be implemented by software running in a trusted packet processing enclave, the packet and/or packet header data may or may not be modified. For example some types of forwarding and/or routing may simply determine a port via which a packet is to be forwarded, without modifying any packet header fields or packet data. Other types of packet processing operations may modify packet header data, such as decrementing a time to live (TTL) value for an IP packet.

Figure 6A:
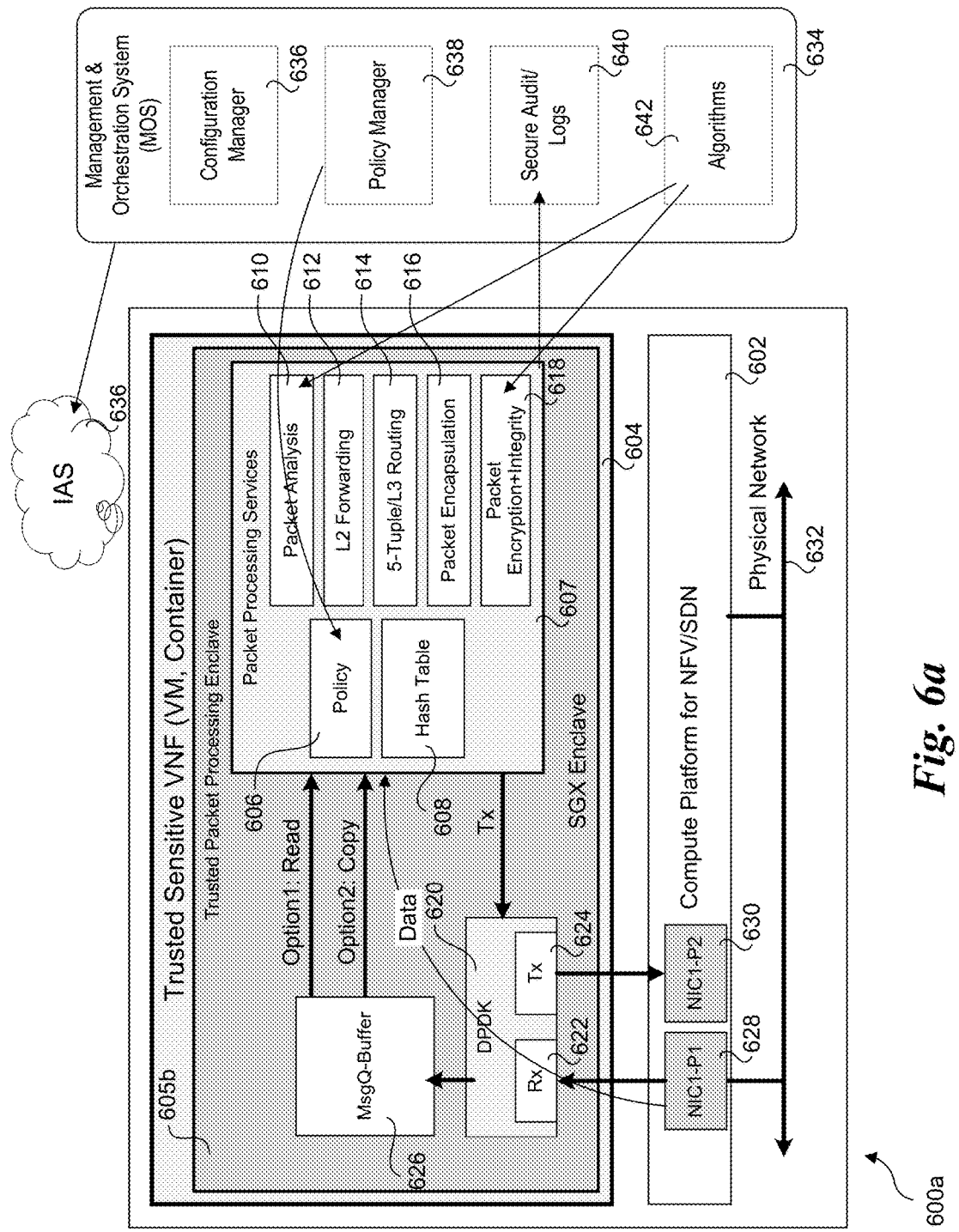
FIG. 6a is a schematic diagram illustrating an embodiment of an NFV SGX architecture in which a trusted packet processing enclave is employed for executing data plane code and packet processing code provided by an MOS.

In some embodiment, data plane library components and corresponding queues, are implemented as part of a trusted packet processing enclave. For example, FIG. 6a depicts a NFV SGX Architecture 600a in which a trusted packet processing enclave 605b includes DPDK 620 and message queue-buffer 626, while the software components in functional blocks of trusted packet processing enclave 605 of NFV SGX architectures 600 are now depicted as being part of packet processing services 607. Once setup, NFV SGX architectures 600 and 600a operate in a similar manner, except under NFV SGX architecture 600a DPDK software is executed within an SGX enclave.

As yet another configuration, the DPDK software may be implemented in its own, separate SGX enclave. Depending on the particular implementation, message queues and buffers associated with the DPDK software components may be implemented within the same SGX enclave, or may be implemented in user space outside of an SGX enclave.

Generally, packet processing may be performed using packet processing software resident in a single enclave for a single VM or container, in multiple enclaves for a single VM or container, or distributed across multiple enclaves associated with multiple VMs or containers. Moreover, the packet processing operations may be implemented using VNF service chaining or the like.

Figure 6B:
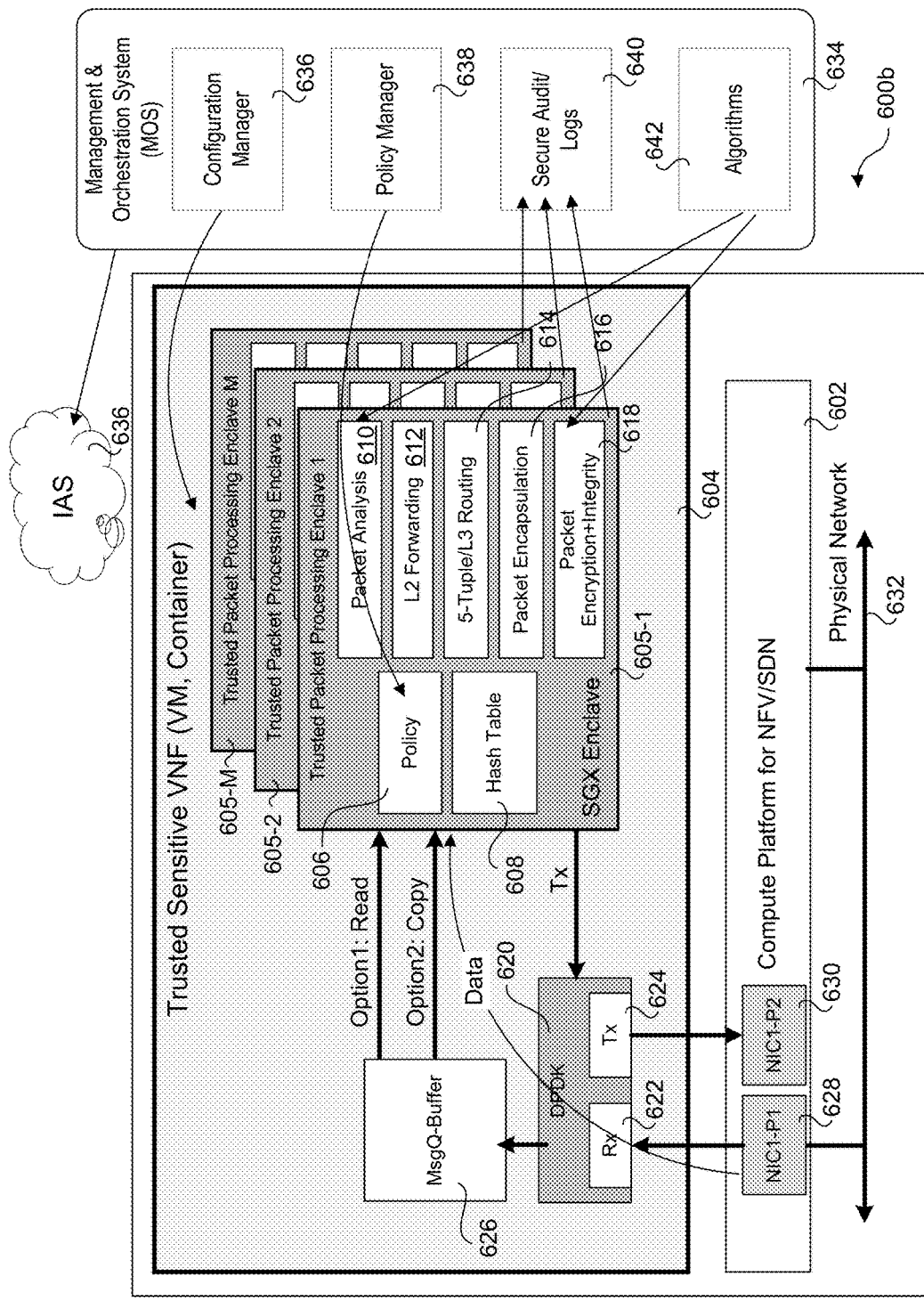
FIG. 6b is a schematic diagram illustrating an embodiment of an NFV SGX architecture in which processing code provided by an MOS is executed in multiple trusted packet processing enclaves.
Figure 7:
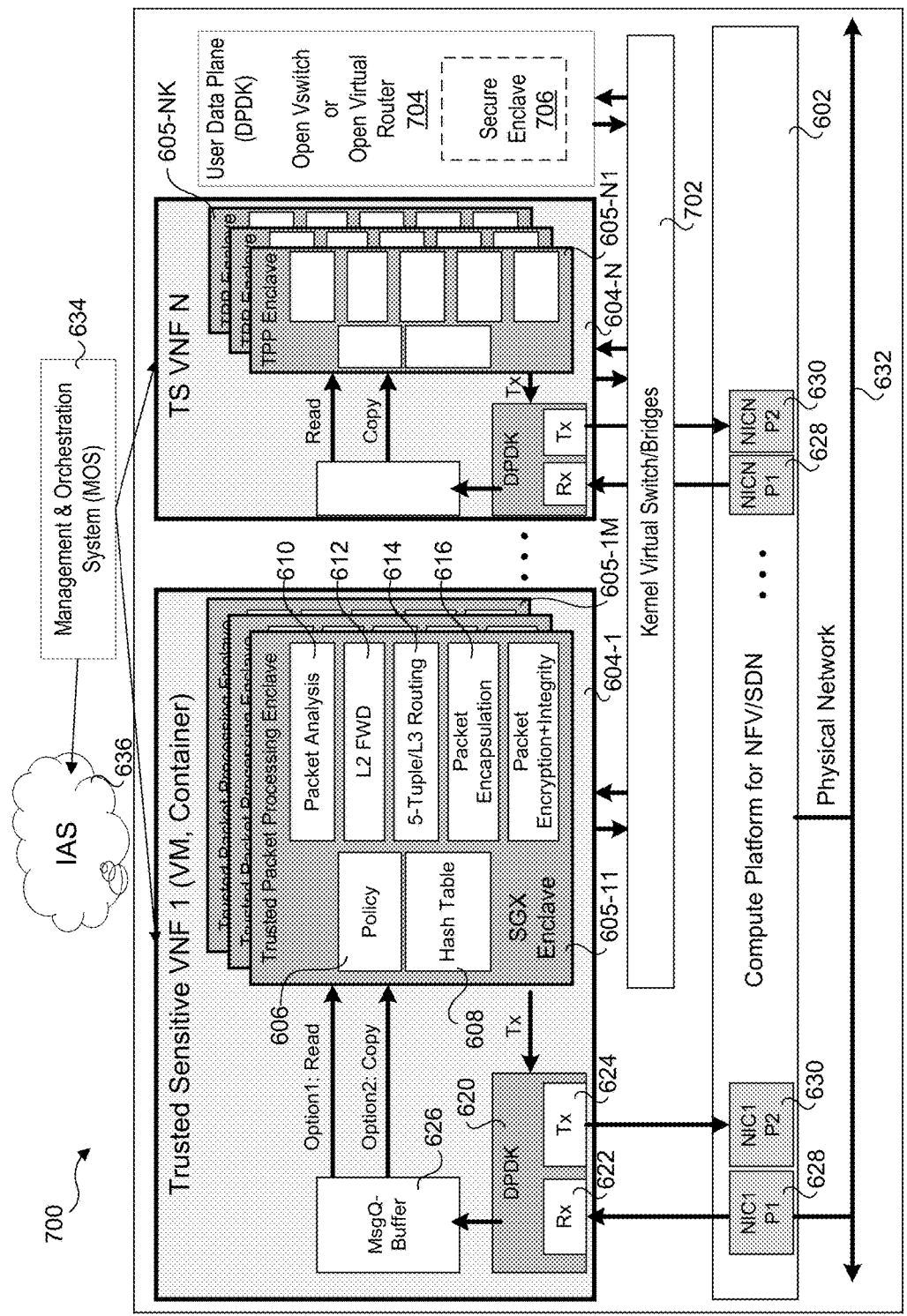
FIG. 7 is a schematic diagram illustrating an embodiment of an NFV SGX architecture in which processing code provided by an MOS is executed in multiple trusted packet processing enclaves deployed in multiple VNFs.

FIG. 6b depicts a NFV SGX Architecture 600b including M trusted packet processing enclaves 605-1, 605-2 . . . 605-M in respective portions of memory allocated for trusted sensitive VNF 604. FIG. 7 depicts a NFV SGX Architecture 700 including N trusted sensitive VNFs 604-1 . . . 604-N, each including one or more trusted packet processing enclaves 605-xy, wherein x identifies the trusted sensitive VNF the enclave is implemented in, and y identifies the identity of the trusted packet processing enclave within that trusted sensitive VNF. For example, there are M trusted packet processing enclaves in VNF 604-1 are labeled 605-11 . . . 605-1M, and there are K trusted packet processing enclaves in VNF 604-N labeled 605-N1 . . . 605-NK. A respective portion of compute platform 602's address space will be allocated for each of trusted packet processing enclave 605 when the enclave is setup.

Under NFV SGX Architecture 700, trust sensitive VNFs 604-1 . . . 604-N are communicatively coupled via virtual switch/bridges 702, supporting communication between software components running within separate VMs and/or containers. Also coupled to virtual switch/bridges 702 is a user data plane 704 including a secure enclave 706. [Could you please add a brief explanation to how this works?].

Generally, each VNF may be associated with a respective network adaptor or NIC, or selected ports on a network adaptor or NIC may be shared across multiple VNFs. The former configuration is illustrated in NFV SGX Architecture 700, wherein trusted sensitive VNF 604-1 is coupled to NIC ports 628 and 630 of a first NIC, while sensitive VNF 604-N is coupled to NIC ports 708 and 710 of an Nth NIC.

Figure 8:
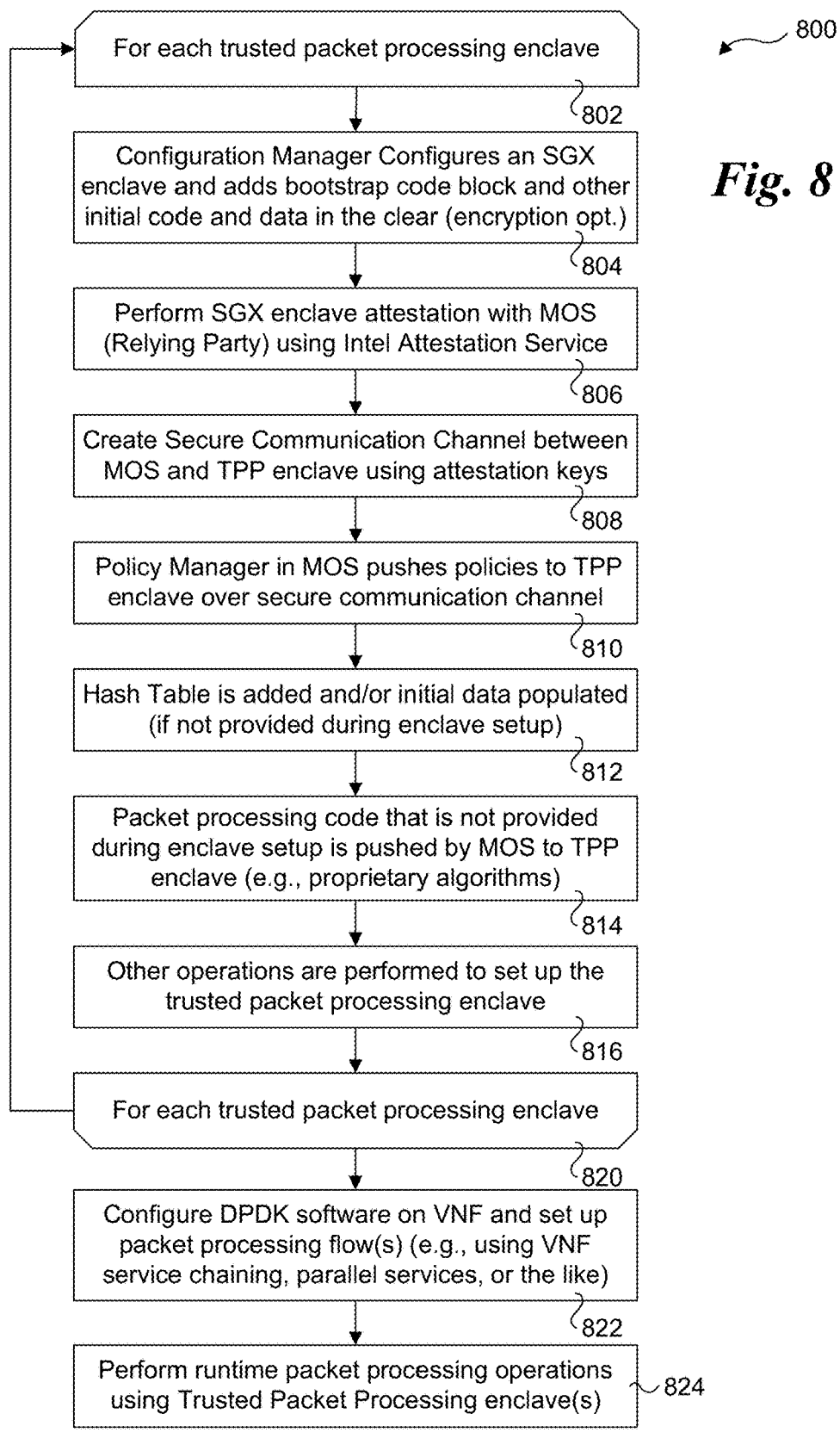
FIG. 8 is a flowchart illustrating operations and logic for configuring the NFV SGX architectures of FIGS. 6, 6a, and 6b, according to one embodiment.

FIG. 8 shows a flowchart 800 illustrating operations corresponding to a process for configuring and performing packet processing operations in one or more secure enclaves using any of NFV SGX Architecture 600, 600a, or 600b. As depicted by start and end loop blocks 802 and 820, a set of operations is performed for each trusted packet processing enclave.

In a block 804, the configuration manager, which is part of an application running on the host compute platform in user space, configures an SGX enclave and adds a bootstrap code block to the SGX enclave in the clear. Optionally, an initial set of code and/or data may also be added to the SGX enclave in conjunction with adding the bootstrap code block. Although this code and optional initial data is added in the clear, the code/data itself may be (optionally) encrypted using a security scheme implemented by the ISV for the implementation.

In a block 806, SGX enclave attestation is performed with the MOS as the relying party. Attestation is use for trustworthiness between a third party (e.g., mobile service operator) and the platform hardware. In one embodiment, remote attestation is performed in the manner describe below with reference to FIGS. 14 and 15.

In a block 808, a secure communication channel is created between the MOS and TTP enclave using keys obtained during attestation. The secure channel uses the keys to encrypt data to be sent over the channel and decrypt the encrypted data upon receipt. Thus, an entity external to the TTP enclave is enabled to communicate with the TPP in a secure manner. It is noted that the external entity still cannot write directly to memory within a TTP enclave, but rather data to be written to the enclave is communicated over the secure communication channel and upon receipt code running in the secure enclave is used to write the data to the secure enclave.

In a block 810, policy manager 638 pushes policies to TTP enclave 605. Optionally, policies may be retrieved from code running in the TTP enclave using a pull model. Generally a policy is anything that dictates how traffic is processed, such as rules, filters, matching criteria, etc. Policies may be implemented through various mechanisms and logic, such as via execution of software instructions that are configured to implement one or more packet processing operations for effecting a policy.

In a block 812, hash table 608 is added and/or initial data is populated if it wasn't previously provided by the MOS during enclave setup in block 804. The hash table will be used during ongoing packet processing operations, as is known in the art—however, since the hash table is located within a secure enclave, its data is protected.

In a block 814, any packet processing code that is not provided in the clear during enclave setup is pushed by MOS 634 to TTP enclave 604. This includes algorithms 642. Optionally, packet processing code may be retrieved from MOS 634 by code running in TTP enclave 604 using a pull model. In a block 816, other operations, as applicable are performed to complete setup of the trusted packet processing enclave to prepare for secure packet processing operations.

After the operations of blocks 804, 806, 808, 810, 812, 816, and 818 are performed for each trusted packet processing enclave, the DPDK software on the VNF is configured and packet processing flows are set up in a block 822. For example, a one or more packet processing operations may be performed for respective classifications of packet flows using parallel and/or chained packet processing operations, as described below.

At this stage, static configuration and setup operations are completed, and the trusted environment is used to perform runtime packet processing via execution of software in the one or more trusted packet processing enclaves, as shown in a block 824. During the runtime operations, dynamic reconfiguration may be performed, as applicable. For example, a new class of Quality of Service (QoS) could be defined by the MOS, and one or more packet processing operations would be performed for packets that are classified to have the new QoS class. The dynamic reconfiguration may also include new algorithms or other packet processing code that is communicated over the secure communication channel to TPP enclave 605 during runtime operation.

Figure 9:
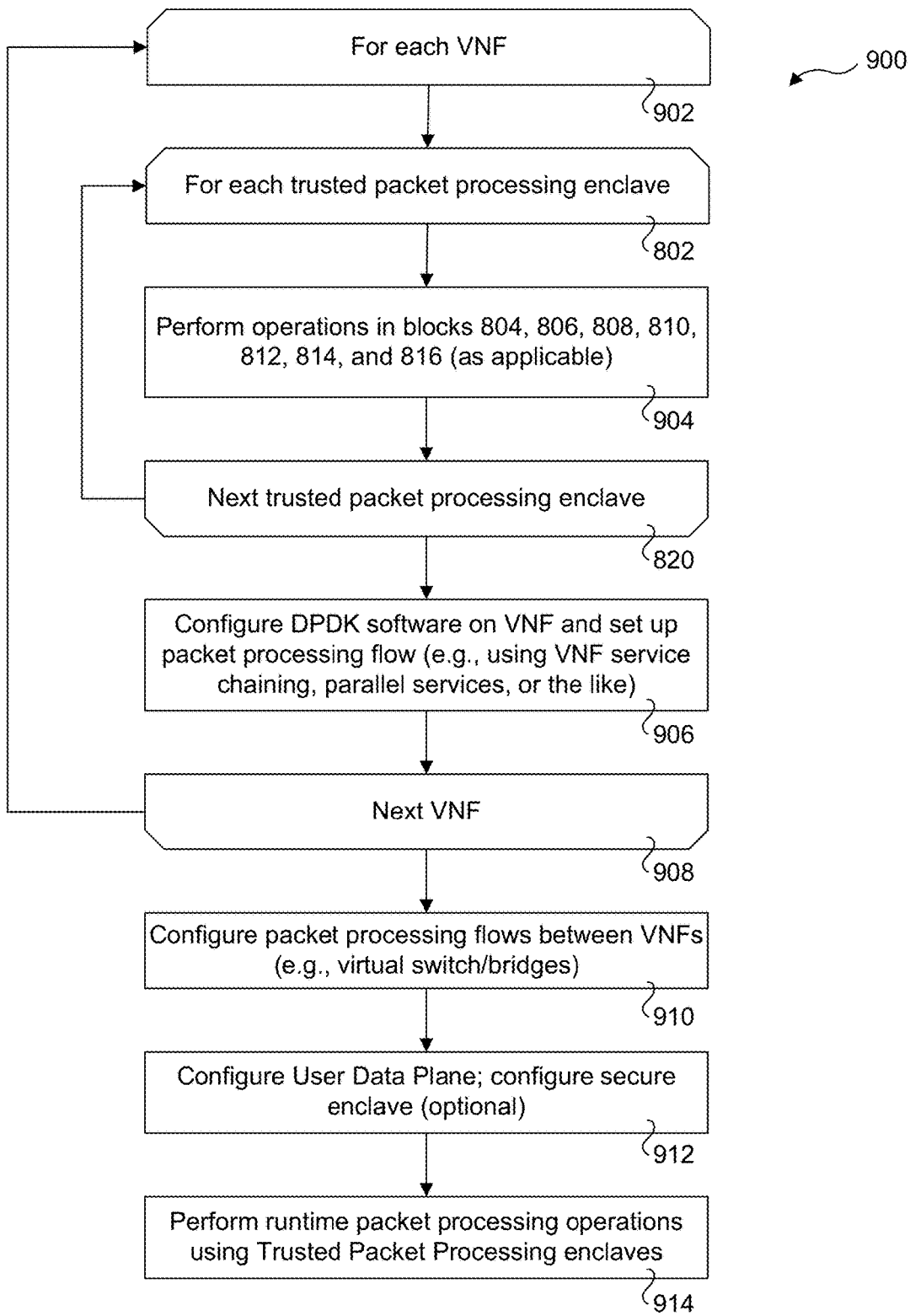
FIG. 9 is a flowchart illustrating operations and logic for configuring the NFV SGX architecture of FIG. 7, according to one embodiment.

FIG. 9 shows a flowchart 900 including operations corresponding to a process for configuring and performing packet processing operations in multiple secure enclaves using NFV SGX Architecture 700 of FIG. 7. The flowchart includes two loops: and outer loop defined by start and end loop blocks 902 and 908 that is performed for each VNF, and an inner loop defined by start and end loop blocks 802 and 820 that is performed for each trusted packet processing enclave in each VNF.

As shown is a block 904, in the inner loop the operations of blocks 804, 806, 808, 810, 812, 814, and 816 are performed for each trusted packet processing enclave in the manner described above for flowchart 800 of FIG. 8 (as applicable). In a manner similar to that described in block 822 of flowchart 800, the DPDK software on each VNF is configured and packet processing flows are set up in a block 906. More specifically, the service chains and/or parallel services that are performed within a single VNF are setup in block 906.

Once each VNF has been configured, packet processing flows between VNFs are set up in a block 910, if applicable. For example, packet processing may involve operations performed by software executing in separate trusted packet processing enclaves on separate VNFs (and running in separate VMs or containers). This is accomplished by forwarding packets from a first VNF to a second VNF via virtual switch/bridges 702, which in one embodiment (for a Type-2 Hypervisor or Virtual Machine Monitor (VMM)) is implemented in one of a Hypervisor, VMM, or the kernel of the operating system running on compute platform 602. In implementations employing Type-1 "bare metal" Hypervisors, such as a Xen environment, functionality similar to that shown for virtual switch/bridges 702 is generally implemented in the Hypervisor or a related component.

In a block 912, the user data plane open Vswitch or virtual router 704 is configured. Optionally, secure enclave 706 may also be configured if it is to be used. For example, under the DPDK software, virtual switches and/or routers are supported that enable packets to be forwarded between DPDK Rx and Tx buffers within a VNF or between VNFs.

At this stage, static configuration and setup operations for NFV SGX Architecture 700 are completed, and the trusted environment is used to perform runtime packet processing via execution of software in multiple trusted packet processing enclaves running on multiple VNFs, as shown in a block 914. As before, during the runtime operations, dynamic reconfiguration may be performed, as applicable.

Figure 10:
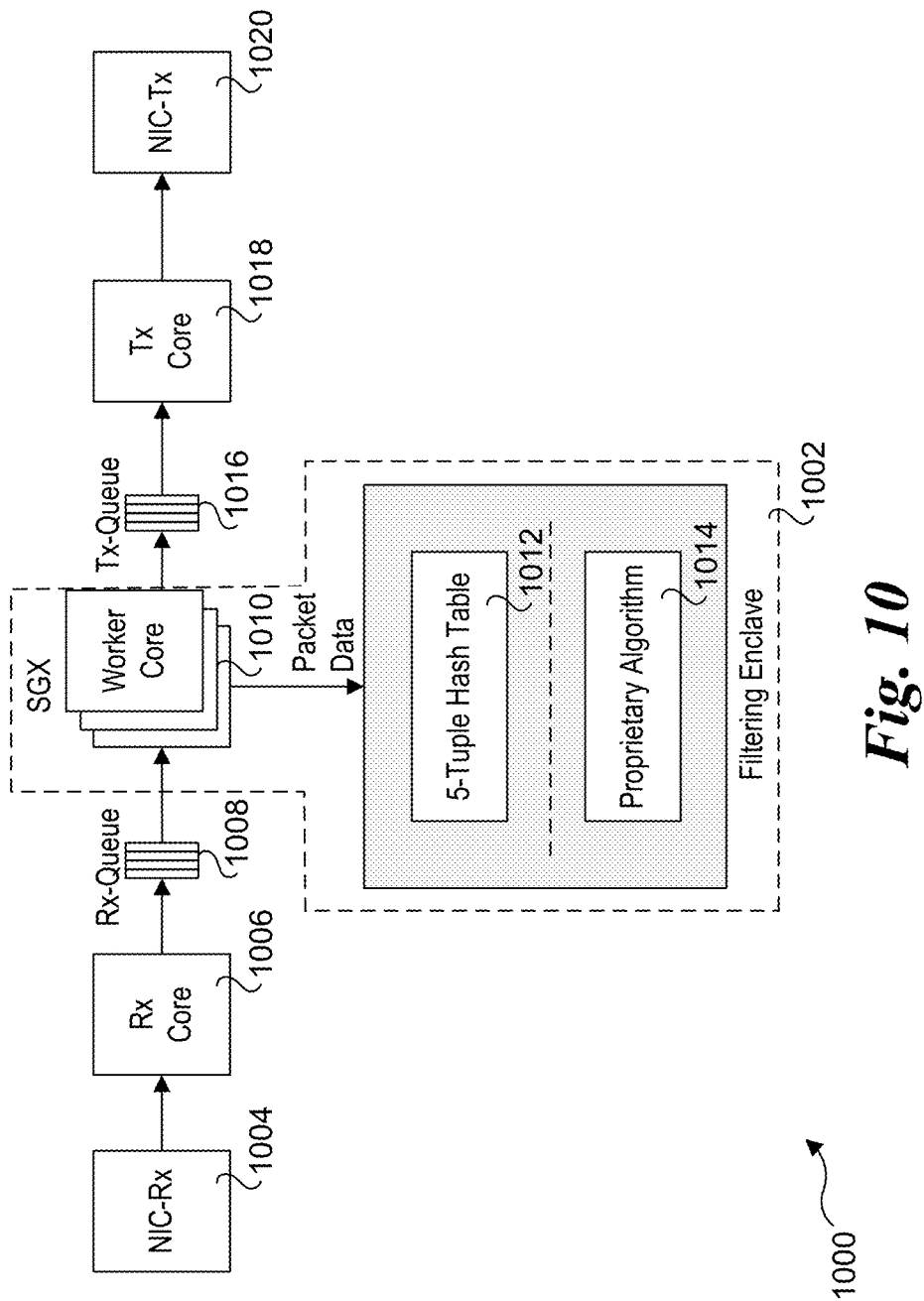
FIG. 10 is a diagram illustrating a process flow for packet processing using a secure filtering enclave.

FIG. 10 shows a process flow 1000 for packet processing using a filtering enclave 1002. Packets are received at a NIC Rx port 1004 and processed via an Rx core 1006, which corresponds to one of the cores on a multicore processor used to run software used for performing packet receive operations. The receive software copies packets from NIC Rx port 1004 to an Rx queue 1008. Packets in the Rx queue are pulled in by code in filtering enclave 1002 executing on one of worker cores 1010. Software executing in filtering enclave 1002 and associated data includes a 5-tuple hash table 1012, and a proprietary filtering algorithm 1014, which are illustrative of a simple packet filtering process that is executed in an SGX enclave. After each packet has been processed, it is placed by software executing in filtering enclave 1002 into Tx queue 1016. Software running on a Tx core 1018 copies data from Tx queue 1016 into a NIC Tx port 1020. It is noted that similar operations shown in FIG. 10 may be performed in parallel using one or more Rx queues and Tx queues.

In the NFV SGX Architecture 600, 600a, 600b, and 700, packet processing operations and associated data, such as hash tables and keys, are implemented in SGX enclaves (e.g., trusted packet processing enclaves) that are allocated to VNFs in VMs and/or containers running the physical compute platform hardware. Under the various configurations, packet processing operations may be implemented in a single enclave, in multiple enclaves associated with a single VNF and VM or container, or across multiple enclaves including enclaves associated with different VNFs and VMs or containers.

Figure 11A:
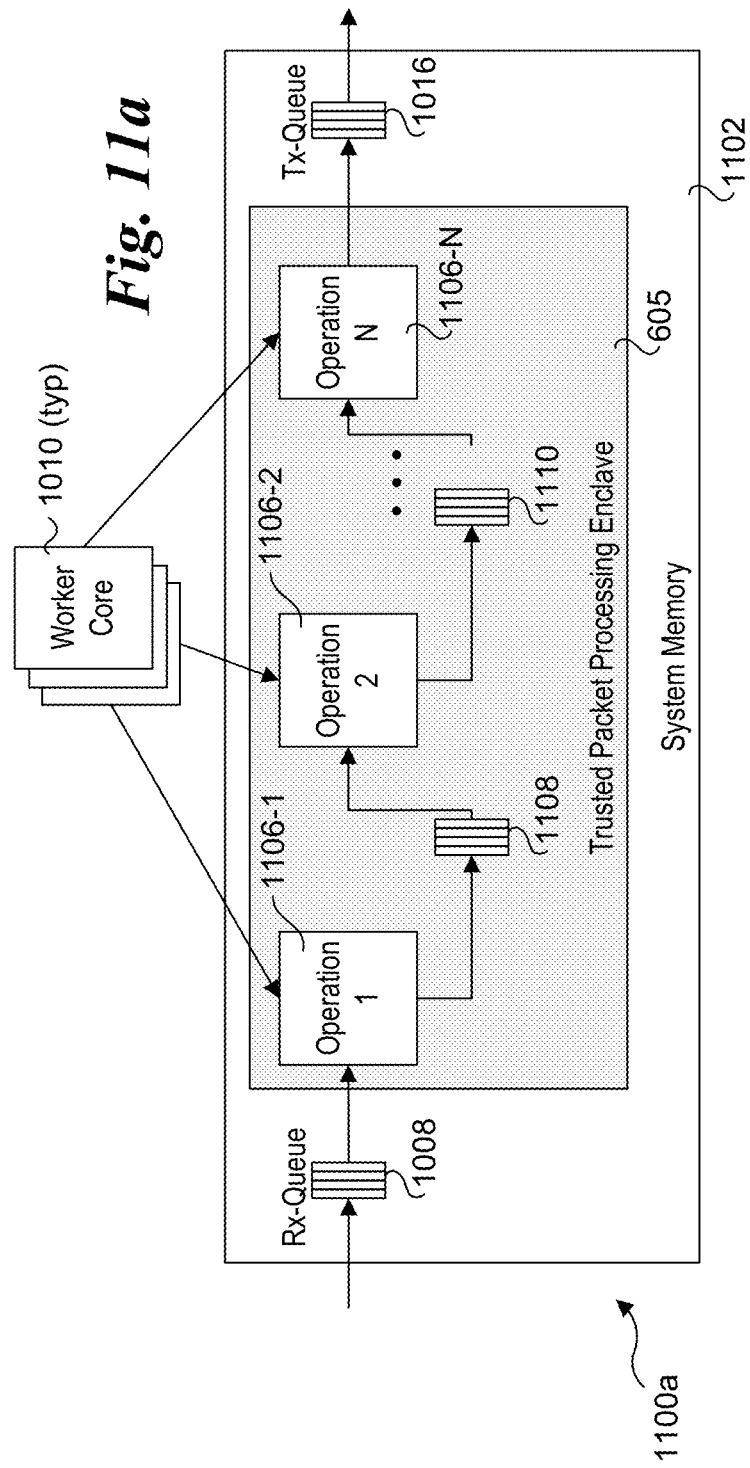
FIG. 11a is a diagram illustrating a packet processing flow using a service chain of packet processing operations executed within a trusted packet processing enclave.

For example, FIG. 11a illustrates a packet processing implementation 1100a under which packet processing operations respectfully associated with N packet processing blocks 1106-1 . . . 1106-N are performed via execution of software associated with each operation in a single trusted packet processing enclave 605 in system memory 1102. Under this embodiment, the packet processing operations comprise a service chain implemented in a single SGX enclave. As illustrated, packets in Rx queue 1008 are pulled into a buffer associated with packet processing block 1106-1 (not shown), wherein a first operation 1 is performed on the packet (such as a first SDN function). Upon completion of operation 1, the packet is forwarded to a queue 1108 from which packets are pulled in and processed by a second operation 2 performed in packet processing block 1106-2. Upon completion of operation 2, the packet is forwarded to a queue 1110 from which packets are pulled in and processed by a next packet processing block. This pattern continues until the packet is processed by the Nth packet processing block 1106-N in which an Nth operation N is performed. Upon completion of operation N, the packet is placed in Tx queue 1016.

Generally, software for implementing multiple packet processing operations in a service chain or the like may be executed on one or more processor cores, as depicted by worker cores 1010. During execution of the software in packet processing blocks 1106-1 . . . 1106-N, each of the worker cores will be executing in a secure enclave mode. It is further noted that under packet processing implementation 1100 the queues 1108 and 1110 are implemented within the same SGX enclave (trusted packet processing enclave 605) as the software code.

Figure 11B:
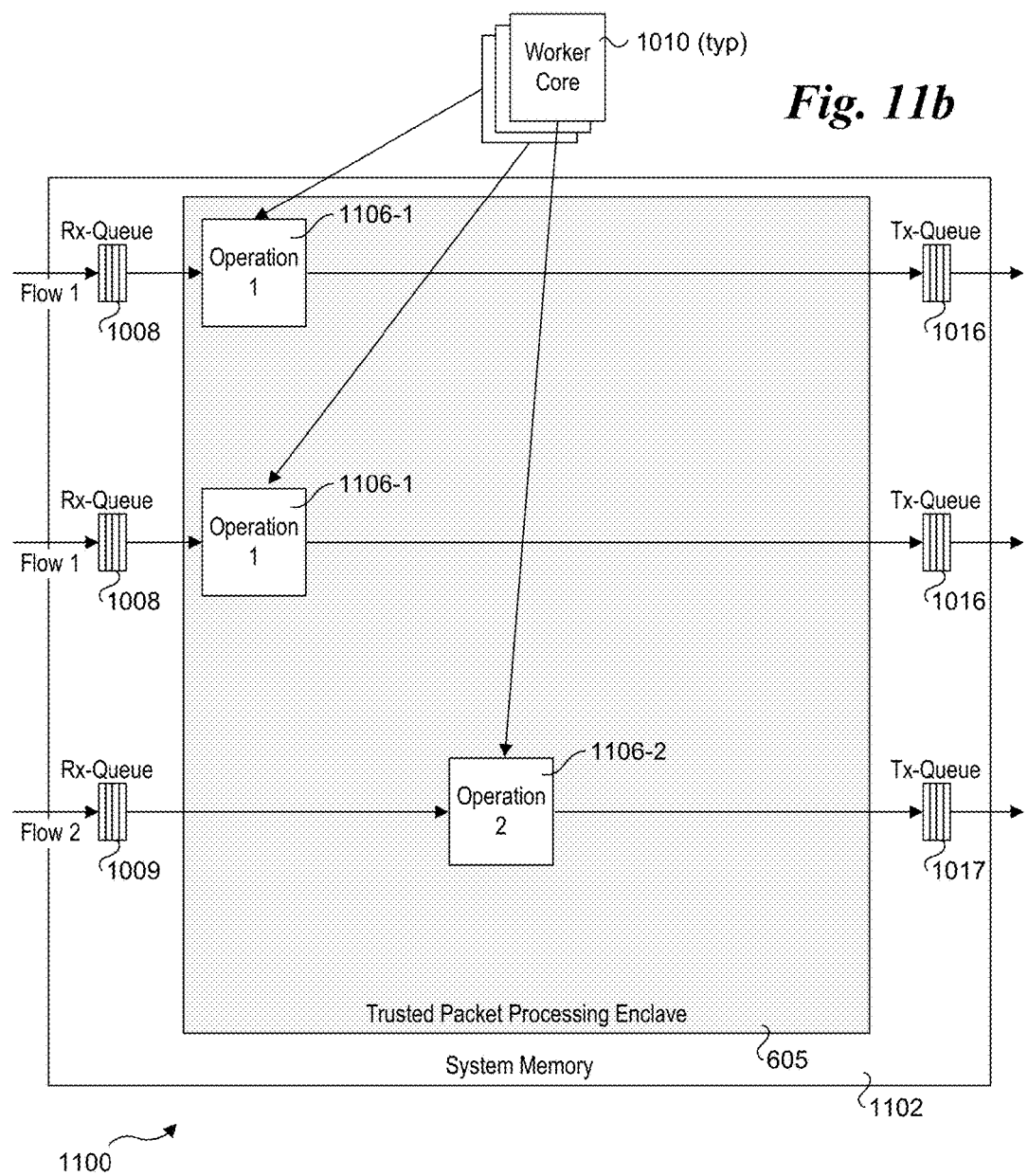
FIG. 11b is a diagram illustrating multiple packet processing flows implemented in parallel using packet processing operations executed within a trusted packet processing enclave.

As illustrated in a packet processing implementation 1100b of FIG. 11b, packet processing operations may also be performed in parallel. In this example, two instances of packet processing operation 1 are performed using respective worker cores 1010 on packets corresponding to a first flow 1, while a third packet processing operation 2 is performed using a separate worker core 1010 on packets corresponding to a second flow 2. As further shown, each of the instances of operation 1 retrieve data from Rx queue 1008 and forward data to Tx queue 1016. It is noted that this instances of Rx queues 1008 and Tx queues 1016 in FIG. 11b and other figures herein may correspond to the same Rx queue and Tx queue, or separate Rx queues and Tx queues.

As shown for second flow 2, packets in an Rx queue 1009 are processing by operation 2, and upon completion of the packet processing performed by operation 2, the processed packets are placed (e.g., via a DMA copy or transfer) in a Tx queue 1017. In some embodiments, packet classification is performed by a NIC, wherein the NIC includes an instance of hash table data and is configured to employ the hash table data to classify incoming packets and place those packets into Rx queues based on their classification (e.g., one or more queues would be configured for respective packet flows based on classification of those flows). Under embodiments in which packet classification for packets in existing flows is performed by software running in a secure enclave, the packets will be placed in Rx queues that are not related to the flows, as the packets have yet to be classified. Thus, under this case, each of operations 1 and 2 would pull packets from the same Rx queues or instances of Rx queues that are not tied to any particular packet flows.

Figure 11C:
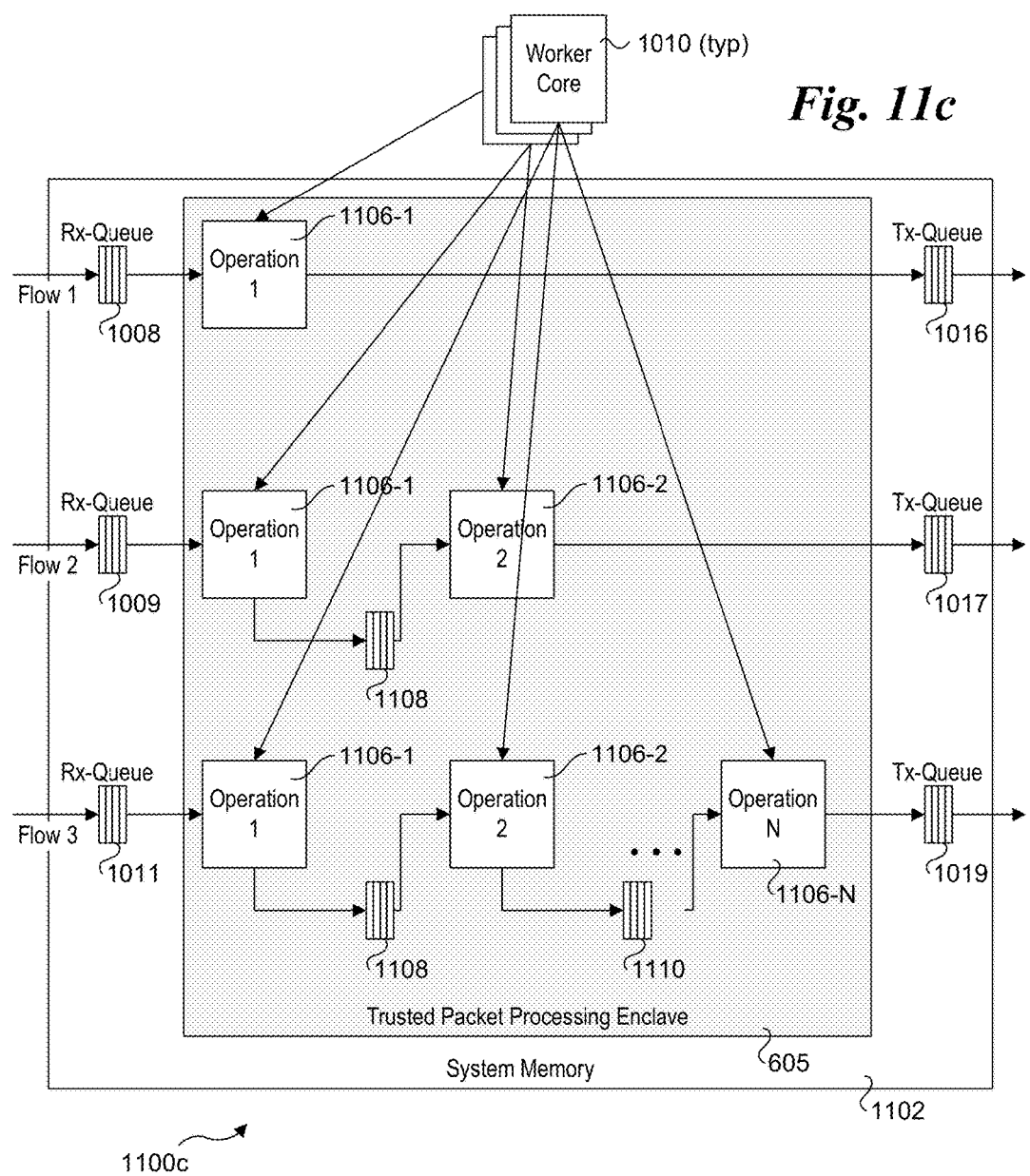
FIG. 11c is a diagram illustrating multiple packet processing flows implemented in parallel using packet processing operations executed within a trusted packet processing enclave, wherein the packet processing operations include a single block of operations or a service chain of operations performed for respective packet flows.

FIG. 11c illustrates a packet processing implementation 1100c under which one or more packet processing operations are performed for respective packet flows in parallel. Packets corresponding to flow 1 are processed using operation 1, which pulls from an Rx queue 1008 and places processed packets into a Tx queue 1016. Packets corresponding to flow 2 are processed using operations 1 and 2 implemented in a service chain, wherein packets are pulled from an Rx queue 1009 and placed into a Tx queue 1017. Meanwhile, packets corresponding to flow 3 are processed using a service chain including N operations 1 . . . N, wherein packets are pulled from an Rx queue 1011 and placed into a Tx queue 1019.

In one embodiment, separate packet processing service chains including one or more packet processing operations are processes using respective worker cores 1010. Optionally, work for a given service chain may be distributed across worker cores 1010. An advantage using a single worker core is that data that is placed in queues such as illustrated by queues 1108 and 1110 can be maintained in an L1 or L2 cache without requiring another worker core to access the data, which at the least will involve accessing the from a last level cache (LLC) or may require access to system memory.

It is further noted that any of the packet processing operations or service chains illustrated herein may be implemented in parallel. For example, an actual implementation may support upwards of millions of packet flows, and many instance of packet processing operations, such as flow classification blocks, may be implemented in parallel.

Figure 12A:
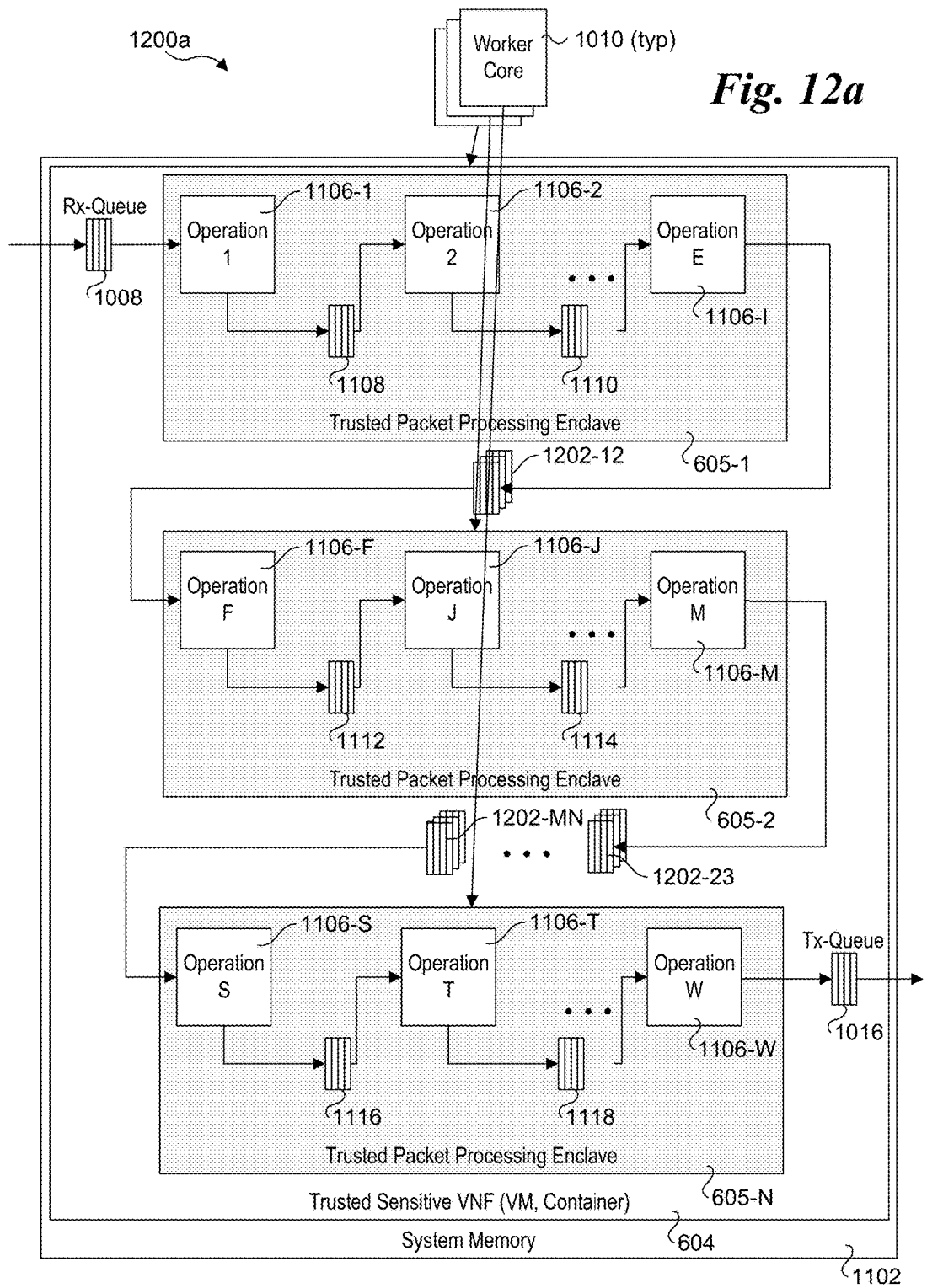
FIG. 12a is a diagram illustrating a packet processing flow including a service chain of operations that includes operations executed in multiple trusted packet processing enclaves implemented in a single VNF.

FIG. 12a illustrates a packet processing implementation 1200a under which packet processing operations respectfully associated with W packet processing blocks 1106-1 . . . 1106-W are performed via execution of associated software running in N trusted packet processing enclaves 605-1 . . . 605-N in system memory 1102. The execution environment is similar to that shown in NFV SGX Architecture 600b, wherein the N trusted packet processing enclaves 605-1 . . . 605-N are implemented in a single VNF running on a single VM or container. In the illustrated embodiment, a sub-chain of packet processing operations is performed in each of the N trusted packet processing enclaves 605-1 . . . 605-N in a manner similar to that described for packet processing implementation 1100a.

In trusted processing enclave 605-1, queues 1108 and 1110 are implemented to facilitate handoff of packet processing operations between the packet processing blocks 1106-1 . . . 1106-E. In trusted processing enclave 605-2, queues 1112 and 1114 are implemented to facilitate handoff of packet processing operations between the packet processing blocks 1106-F . . . 1106-M, while in trusted processing enclave 605-N, queues 1116 and 1118 are implemented to facilitate handoff of packet processing operations between the packet processing blocks 1106-s . . . 1106-W.

Packet processing implementation 1200a further employs queues that are in the memory space allocated for VNF 604, but external to the trusted packet processing enclaves. These queues are labeled 1202ij wherein the i value identifies the trusted packet processing enclave that includes the last packet processing block in the sub-chain that places a packet into the queue and the j value identifies the trusted packet processing enclave that includes the first packet processing block of the next sub-chain. The reason queues 1202ij are implemented outside of the trusted packet processing enclaves is each SGX enclave prevents any access to the enclave from an external entity. As discussed above, code running in a given SGX enclave can access both code and data within that enclave and external to the enclave. Thus software for implementing the operations in packet processing blocks 1106-1, 1106-E, 1106-F, 1106-M, 1106-S and 1106-W is enabled to access queues that are external to the SGX enclaves they are running in.

It is further noted that different packet flows with different classifications may be processed with different sets of chained operations, or even a single operation. Moreover, different queues may be used for the different flows—for simplicity, only a single queue or a small number of queues are shown in the Figures herein, but it will be understood by those having skill in the art that multiple queues may be implemented. For example, a packet flow that is classified to have a higher Quality of Service (QoS) may use a separate set of queues as compared with packet flows having a lower QoS.

Figure 12B:
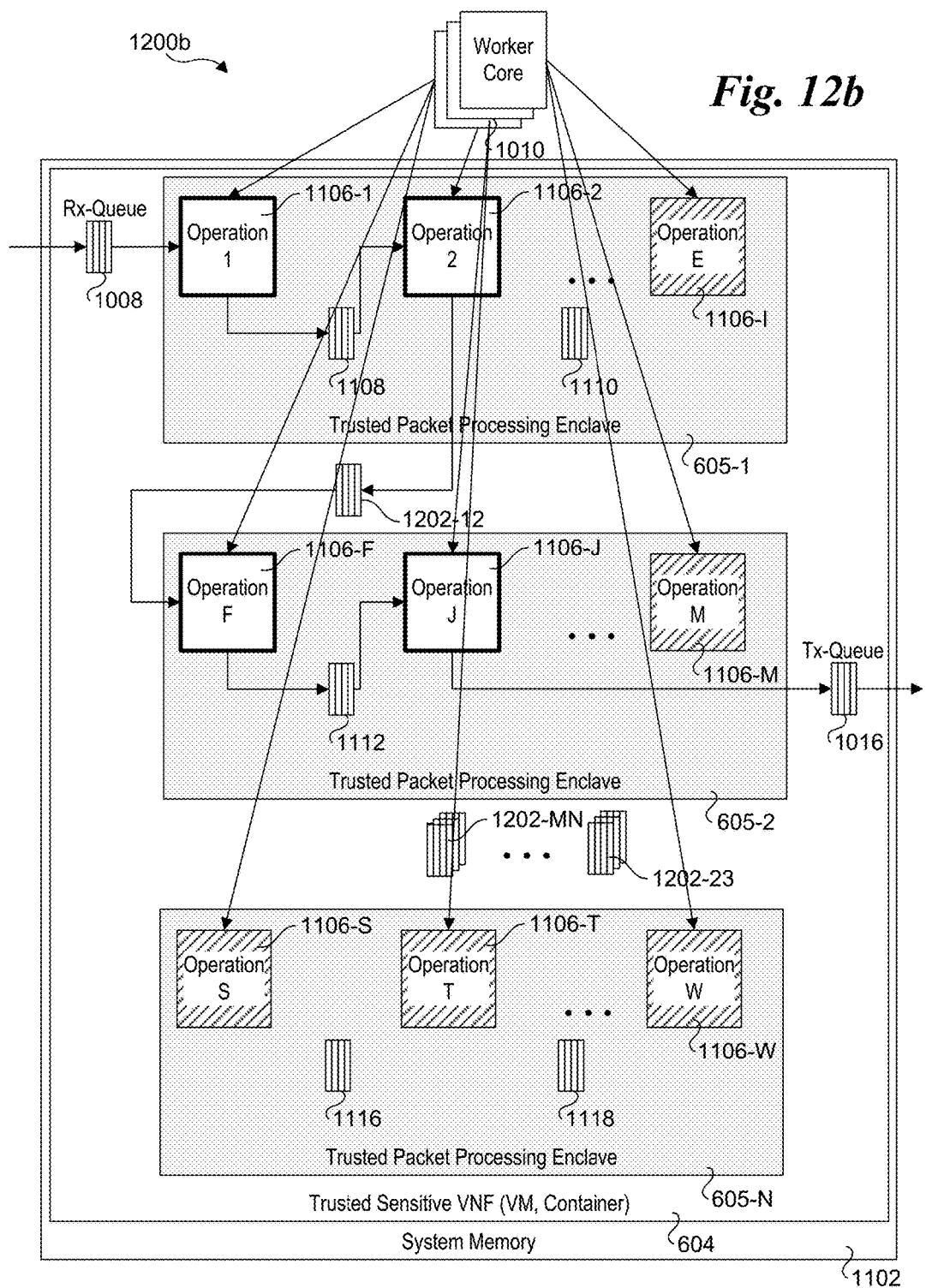

Packet processing implementation 1200b of FIG. 12b shows an example of packet processing operations that uses selected packet processing blocks 1106 from among the available packet processing blocks 1106-1 . . . 1006-W. As shown, the packet processing sub-chain in trusted packet processing enclave 605-1 includes operations 1 and 2, while the packet processing sub-chain in packet processing enclave 605-2 includes operations F and J, while there are no packet processing blocks 1006 used in any other trusted packet processing enclave. As a result, the chain of packet processing operations includes Rx queue→operation 1→operation 2→operation F→operation J→Tx queue. It is further noted in some embodiments selected (or even all) packet processing blocks 1006 are configured to access queues 1202ij, enabling packet processing chains to be configured using a multitude of combinations of packet processing blocks. Optionally, separate sets of queues may be implemented for respective service chains.

FIG. 12c shows a packet processing implementation 1200c under which each of N trusted packet processing enclaves 605-1 . . . 605-1 perform packet processing operations in parallel. For illustrative purposes, a different service chain of packet processing operations is shown for each TPP enclave. However, a given TPP enclave would generally be configured to perform multiple packet processing operations and/or service chains in parallel, similar to that illustrated in FIG. 11c.

As shown in FIG. 12c, packets corresponding to a flow 1 are pulled from an Rx queue 1008 and processed by code running in TPP enclave 605-1 configured to implement a service chain including E operations 1 . . . E. Upon completion of operation E, the packets are placed in a Tx queue 1016. Packets corresponding to a flow 2 are pulled from an Rx queue 1009 and processed by code running in TPP enclave 605-2 configured to implement a service chain including two operations 1 and 2. Upon completion of operation 2, the packets are placed in a Tx queue 1017. Meanwhile, packets corresponding to a flow 3 are pulled from an Rx queue 1011 and processed by code running in TPP enclave 605-2 configured to implement a service chain including two operations 2 . . . E. Upon completion of operation E, the packets are placed in a Tx queue 1019.

Figure 13:
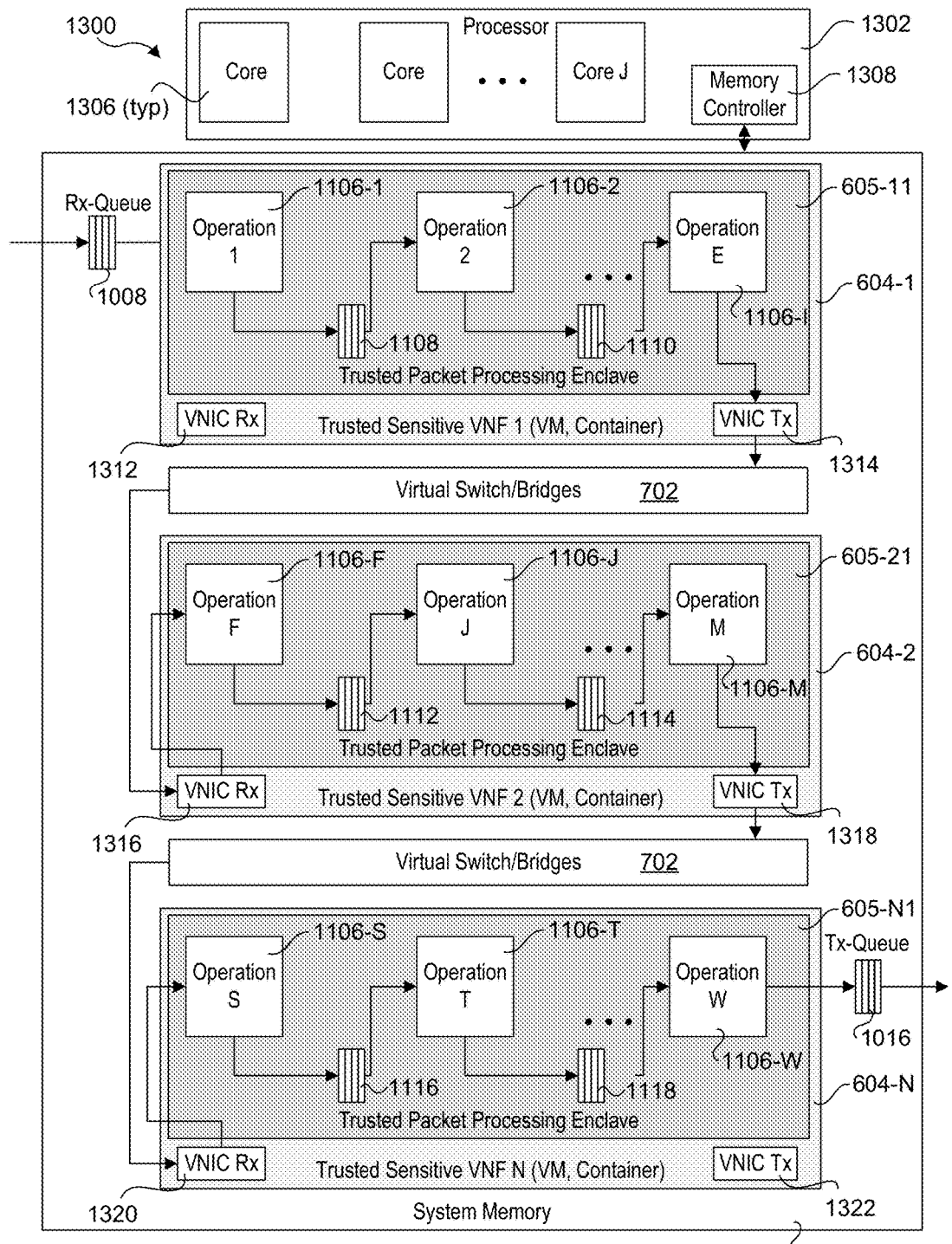
FIG. 13 is a diagram illustrating a packet processing flow including a service chain of operations that includes operations executed in multiple trusted packet processing enclaves implemented in multiple VNFs.

FIG. 13 illustrates a packet processing implementation 1300 under which packet processing operations respectfully associated with W packet processing blocks 1106-1 . . . 1106-W are performed via execution of associated software running in N trusted packet processing enclaves 605-1 . . . 605-N in N trusted sensitive VNFs 604-1 . . . 604-N. Packet processing implementation 1300 is configured to be deployed on an execution environment employing multiple VNFs running on respective VMs or containers, such as NFV SGX Architecture 700 of FIG. 7. The compute platform for the execution environment includes a processor 1302 having J cores 1306 and a memory controller 1308 coupled to system memory 1310.

As with packet processing implementation 1200a of FIG. 12a, packet processing implementation 1300 employs the same sub-chains of packet processing operations corresponding to packet processing blocks 1106-1 . . . 1106-W. However, in this case the software for implementing corresponding operations 1-W are implemented in multiple trusted sensitive VNFs 604. As described above with reference to FIG. 7, each of the trusted sensitive VNF will be implemented in a respective VM or container, which are enabled to communicate with one another using virtual switch/bridges 702. To facilitate communication via a virtual switch or the like, a virtualized environment using multiple VMs or containers include one or more virtual NICs (VNICs) in each VM or container. Each VNIC includes an Rx port and a Tx port. In FIG. 13 the VNIC ports are depicted as VNIC Rx ports 1312, 1316, and 1320, and VNIC Tx ports 1314, 1318, and 1322. The VNICs work in a similar manner to a physical NIC, and include port buffers implemented in system memory (not shown). For simplicity, only a single trusted packet processing enclave is depicted in FIG. 13 as being implemented in each trusted sensitive VNF, but it will be understood that one or more trusted packet processing enclaves could be associated with each trusted sensitive VNF, such as shown in NFV SGX Architecture 700.

The packet processing flow proceeds as follows. Operations 1-E, which are implemented in trusted packet processing enclave 605-11 comprise a first sub-chain of packet processing operations that are performed via execution of software corresponding to packet processing blocks 1106-1 . . . 1106-E, respectively, in a manner similar to that discussed above for trusted packet processing enclave 605-1 of FIG. 12a. Operations F-M, which are implemented in trusted packet processing enclave 605-21 comprise a second sub-chain of packet processing operations that are performed via execution of software corresponding to packet processing blocks 1106-F . . . 1106-M, respectively, in a manner similar to that discussed above for trusted packet processing enclave 605-2 of FIG. 12a. Operations S-W, which are implemented in trusted packet processing enclave 605-N1 comprise an Nth sub-chain of packet processing operations that are performed via execution of software corresponding to packet processing blocks 1106-S . . . 1106-W, respectively, in a manner similar to that discussed above for trusted packet processing enclave 605-N of FIG. 12a.

While the sub-chains of packet processing operations, as well as the overall packet processing chain is the same in packet processing implementations 1200a and 1300, the way packets are forwarded between packet processing blocks is different. Under processing implementations 1300, packets are passed between VMs or containers using the VNIC Rx and Tx ports and virtual switch/bridges 702. As illustrated, upon completion of operation E, packets are forwarded to operation F by copying the packets into VNIC Tx port 1314, forwarding packets from VNIC Tx queue 1314 to VNIC Rx port 1316 via virtual switch/bridges 702, and then the packets are pulled from VNIC Rx port 1316 via operation F. Similarly, upon completion of operation M, packets are forwarded to operation N (not shown) by copying the packets into VNIC Tx port 1318 and forwarding the packets from VNIC Tx queue 1318 to a VNIC Rx port on a VNF 3 (not shown) via virtual switch/bridges 702, to be subsequently pulled from that VNIC Rx port by operation N. At the end of the packet processing chain, packets would be forwarded from a VNIC Tx port on an Mth VFN (not shown) and forwarded from that VNIC Tx port to VNIC Rx port 1320 via virtual switch/bridges 702, and then the packets are pulled from VNIC Rx port 1320 via operation S.

SGX Attestation

SGX attestation can be used to attest to what software is running inside the enclave, which execution environment the enclave is running at, while sealing identity will be used by the enclave, and what is the CPU's security level. This accomplished via a combination of SGX instructions that supports local attestation and an Intel provided attestation enclave to support remote attestation. Once provisioned a secret, an enclave can seal its data using SGX instructions.

SGX attestation also can be used for provisioning secrets to an enclave. As discussed above, an enclave is in the clear before instantiation. While sections of code and data could be encrypted, their decryption key cannot be pre-installed. Secrets come from outside the enclave. Such secrets include keys, passwords, and sensitive data. An enclave must be able to convince a third party that it is trustworthy and can be provisioned with secrets. Preferably, subsequent runs should be able to use the secrets that have already been provisioned.

Platform unique keys are made available to enclave software via EGETKEY. SGX offers various keys for different types of operations (attestation vs data protection). EGETKEY uses a key derivation algorithm to generate enclave specific keys. In one embodiment, inputs to this algorithm include an enclave's identity, and OwnerEpoch, and a Key type.

SGX provides local and remote attestation capabilities. Local attestation allows one enclave to attest its trusted code base (TCB) to another enclave on the same platform. Remote attestation allows which one enclave to attest its TCB to another entity outside of the platform.

Under remote attestation, SGX provides a hardware assertion, called a REPORT, that contains calling enclaves attributes, measurements and user supplied data. An Enclave calls EREPORT instruction to generate a REPORT structure for a desired destination enclave. The REPORT structure is secured using the REPORT key of the destination enclave. EGETKEY is used by the destination to retrieve the REPORT key and then verifies structure using software.

Figure 14:
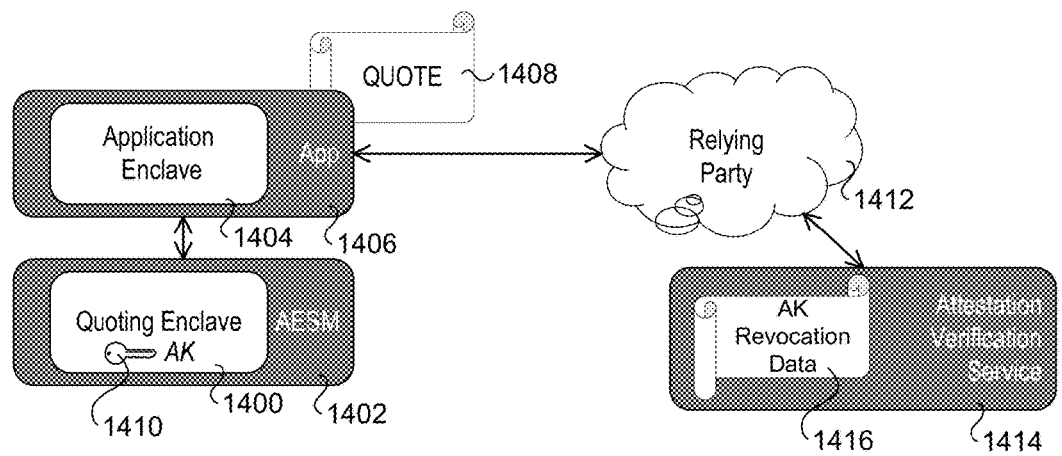
FIG. 14 is a diagram illustrating a remote attestation mechanism, according to one embodiment.

Under remote attestation, SGX uses a quoting enclave to convert LOCAL attestations to a REMOTELY verifiable assertion, called a QUOTE. As illustrated in FIG. 14, a quoting enclave (QE) 1400 in an Application Enclave Service (AESM) 1402 locally verifies a REPORT produced by an application enclave 1404 associated with an application 1406 and signs it as a QUOTE 1408. QE 1400 uses an asymmetric attestation key (AK) 1410 that reflects the platform's trustworthiness. Application 1406 sends Quote 1408 to a relying party 1412 to verify. Relying party 1412 also is depicted as accessing an attestation verification service 1414, which includes AK revocation data 1416.

Figure 15:
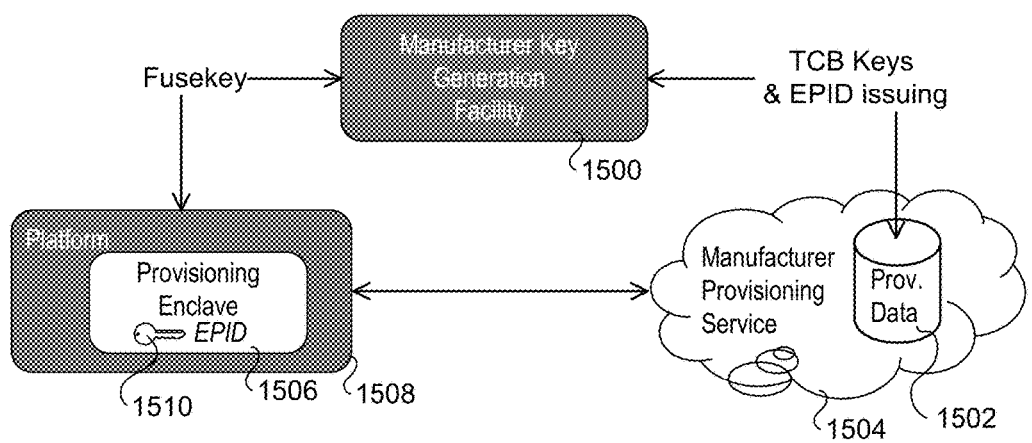
FIG. 15 is a diagram illustrating components for provisioning SGX with hardware-based keys.

FIG. 15 illustrates components for provisioning SGX with hardware-based keys. In one embodiment, a manufacturer employs a key generation facility 1500 to generate and fuse a unique key during manufacture of a processor. The manufacturer maintains a database 1502 of these keys that is accessed via a manufacturer provisioning service 1504. The manufacturer generates provisioning blobs (binary large objects) for each device specific to the device TCB and provisioning enclave. The protocol between the provisioning enclave 1506 associated with a platform 1508 and manufacturing provisioning service 1504 involves two operations. First, platform 1508 proves it has a key 1510 that the manufacturer put in a real processor. Second, manufacturer provisioning service 1504 certifies an Attestation Key for the platform.

In one embodiment, an Enhanced Privacy Identifier (EPID) key is used for platform identity. EPID is a Group-based anonymous signature scheme that requires three keys: a master issuing key, a group public key, and a member private key. Member private keys will be generated on the platform. Public keys and revocation lists are issued to EPID verifiers, such as manufacturer provisioning service 1504.

NFV/5G Security Monitoring and Lawful Intercept (LI)

Security Monitoring is the ability to view deeply into the entire network (virtual and physical), and deliver and enforce automated security management that is consistent with changes being applied by NFV orchestrators and Virtualized Infrastructure Manager (VIM) controllers. As specified by 3 GPP 33.106 V13.3.0-LI Requirements, Lawful Interception (LI) is the action (based on the law) for specific target identity(s), by a network operator/access provider/service provider, of accessing and delivering in real-time certain current information to a Law Enforcement Monitoring Facility (LEMF). This information includes Intercept Related Information (IRI) and Content of Communications (CC). Traditional Security Monitoring and Lawful Interception Techniques will either NOT scale or CANNOT be Deployed for NFV.

ETSI (European Telecommunications Standards Institute) NFV Normative Specification SEC013 on Security Monitoring defines an NFV Security Monitoring architecture and protocols to enable security analytics for detecting threats and mitigating attacks. It also propose VNF Security Life Cycle Management for virtual Security Functions.

The multi-stage Service Function Chaining (SFC) method isolates particular packet processing services (e.g., decryption, de-compression, packet inspection) into separate VMs that may run services (applications or apps) on different guest operating systems (OSs) from different software vendors. For an operator VNF environment, a SFC may comprise an LTE core network PGW (Packet Data Network Gateway) tunneling traffic from the UE (user equipment), and utilizing virtualized MME (Mobility Management Entity) and SGW (serving gateway) functions on the same platform. An embodiment of this scenario is in the Mobile Edge Core (MEC) or Cloudlet computing model, where wireless LTE traffic is processed and handled at the edge of the LTE network.

ETSI NFV defines a virtual network function (VNF) to be comprised of one or more virtual network function components (VNFCs). VNFCs are used for scale out/in as the operator traffic varies. VNFCs appear as a single VNF to the Manageability and Orchestration (MANO) layer.

NFV Security Monitoring SGX Use Case & Requirements

Traffic monitoring in NFV/Cloud is needed for troubleshooting, intrusion detection, data leak prevention, performance monitoring and also to support regulatory and legal requirements, such as LI. Under the conventional approach, the traffic monitor application is provided by the service provider, but in some cases such as LI, a law enforcement agency may like to have their own logic to do policy enforcement, pre-screening, etc. Since monitored traffic is sent to critical services such as IDS, DLP, and LI recording, it is necessary that the traffic policy enforcement, pre-analysis and even the transport should be securely executed. Also, some entities are required by law to ensure that their policies and its execution if protected from unauthorized eaves-dropping, including system/network/security administrators.

In particular, it is important to protect algorithms and their execution, policies, hash tables, and other intermediary data or meta-data, policy delivery keys and traffic encryption keys. Under current security proposals, VMM system administrators shall not be able to read the policies and algorithms in memory and storage, thus providing confidentiality of data and code. In addition, cyber attackers exploiting vulnerabilities in the applications should not get hold of policies. Thus, a means of isolating such policies is to be provided.

In traditional, non-virtualized deployments, a network operator correlates and analyses data collected from the user data plane and management and control planes. This correlated analytics assist the Operators to better manage their network, including the ability to track the network usage, subscriber dynamics, content paths, SLAs, and any network threats and anomalies. Network-borne attacks like exploitation of vulnerabilities, spreading of malware, exfiltration of data and service disruption can be detected and remediated. Certain collected probes can also provide network and user experience analytics, and help address security impacts to the mobile customers, mobile carrier, and the downstream in general public. Any applicable threat remediation and countermeasures can then be deployed.

In non-virtualized deployments, many of the interfaces between the functional components are standardized and exposed, and hence the traditional active or passive probes can be used to monitor the packets, flows, configurations and any metadata in the management, data and control planes. These are used for performing security analytics, including deep packet inspection (DPI) functions and correlation. This type of monitoring mechanism is usually prevalent and applicable to different types of networks such as Operator's networks, IMS, enterprise networks and can be applied at different parts of the network, e.g. core and access. Traditional deployments generally have a single administrative control.

With the deployment of NFV technologies, the interfaces for security monitoring are not as distinct for access. These interfaces might be concealed by consolidated vertical "function silos" or by collapsed stacks like shared memory and virtual sockets, as opposed to using IP. ETSI NFV has published multiple virtualized models where these monitoring interfaces may be obscured. Access interfaces in the myriad deployments (e.g. within a VNF, or between multiple VNFs on the same hypervisor, etc.), make it difficult to probe the desired data for security monitoring. In some cases, deployments might implement vendor-proprietary, non-3GPP standardized interfaces to optimize processing power and reduce signaling latency. In addition, security monitoring should comprehend and be effectively deployable within the ETSI NFV model that introduces multiple infrastructure and tenant domains.

NFV deployments have to provide an exceedingly greater level of Security Monitoring than in traditional non-NFV deployments, largely because NFV usages drive secure service delivery automation, live migrations, and orchestrated network and security management. In NFV deployments, orchestrators and controllers can automate virtual networks, virtual network functions and dynamic chaining, as well as applications. This diminishes the effectiveness of traditional physical security devices mostly because their lack of visibility into changes of the virtualized functions, service chains, and into the traffic being exchanged on virtualized platforms. A larger share of traffic is comprised of inter-VM traffic, also sometimes referred to as "East-West" traffic. In addition, virtual switches and virtual routers are increasingly being used for network policy and traffic re-direction. These policies, their associated configurations, management actions, faults and errors, and traffic must be monitored for security assurances. The problem of security monitoring is the ability to view deeply into the entire network (virtual and physical), and deliver and enforce automated security monitoring management that is consistent with changes being applied by NFV orchestrators and VIM controllers.

This lack of visibility into management, control and data packets in an ETSI NFV virtualized system should be explored and addressed to enable the same robustness and visibility that exists in the current Operators networks. This includes security monitoring across the newly defined ETSI NFV interfaces, including all traffic for VNF management and control. In addition, the mechanisms should scale per the orchestration-based scaling of the NFV network, including a mixed deployment of NFV and traditional network functions.

In most cases, different trust domains have distinct and separate monitoring. For instance, Infrastructure Security Monitoring is administered by the Infrastructure provider to ensure that the NFV infrastructure (NFVI) is secure and robust for all Tenants. An administrator will have access to all NFVI security controls that can be impacted at the NFVI. A security goal of the Infrastructure providers is to ensure that the Tenant VNFs/VNFCs and Tenant traffic is not violating the NFVI established security policies, nor causing any malware proliferation into the NFVI or into other Tenants' assets. A Tenant's administrative domain is confine to the Tenant's VNFs/VNFCs and Tenant network. A Tenant can only monitor its own virtual network and ensure that the Tenant security controls are being met by the infrastructure. A Tenant does not have any knowledge of the NFVI nor of other Tenants. Existence of multiple trust domains and their distinct separation is a fundamental NFV deployment aspect and requirement. A uniquely subtle case is when the Operator has their own NFVI and run as a tenant as well. In these cases, Operators may still choose to keep the NFVI and Tenant trust domains as distinct (different departments running on same NFVI), or the same (Operator virtualizing their own Service Functions), depending on their Security Policies.

Figure 16:
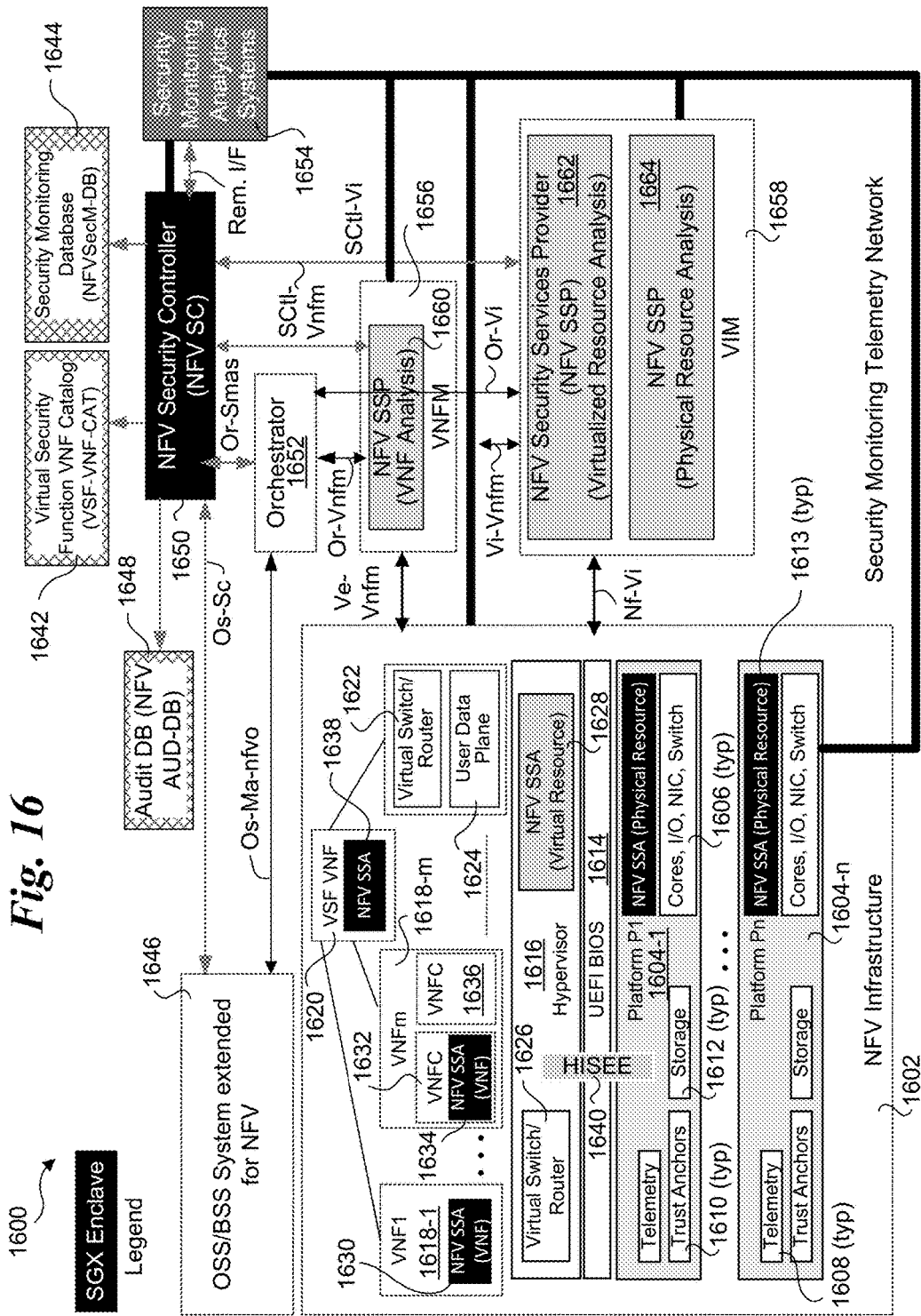
FIG. 16 is a schematic diagram illustrating an NFV security monitoring architecture as proposed for ETSI NFV SEC013 in which multiple secure enclaves are implemented.

FIG. 16 illustrates an NFV security monitoring and management architecture 1600 as proposed for ETSI NFV SEC013. This logical architecture comprises of the following components, each of which comprises APIs and functions. In specific implementations, as determined by trust domains and deployment security policies, a particular instance of a Security Controller may have one or more of the reference points shown in the diagram, but may not necessarily implement more than one reference point. This security model builds upon the ETSI NFV architecture, and proposes security enhancements to the ETSI NFV architecture.

The NFV Security Services Agent (NFV SSA) is comprised within the NFVI, as a VSF VNF, or within a VNF, and responsible for securely receiving the Security Monitoring policy and implementing the same. A VSF is a SSA and can be a purpose-built security virtual appliance or Monitoring Agent, which interacts with the NFV SC.

The NFV Security Services Provider (NFV SSP) is comprised within the VIM and VNFM, and is responsible for security monitoring policy orchestration received from the Security Controller (NFV SC) and interacting with the various VIM/VNFM components to implement the policy across various systems comprising the NFVI/VNF. Furthermore, NFV SSP is also responsible for receiving the telemetry data from various NFV SSAs, and optionally making some analysis based on this data.

The NFV Security Controller (NFV SC) may interface with other security systems (e.g. Security Analytics), security databases and other policy engines. The NFV SC orchestrates system wide security policies within the NFVI. The NFV SC acts as a trusted 3rd party that resides independently. An NFV SC manages NFV SSAs (like VSFs) to keep them in a consistent state according to the policy specified. NFV SC includes a SSA catalog of security functions that can be orchestrated and deployed at system start-up or dynamically using the VIM, and SC also facilitates secure bootstrapping of SSAs (like VSFs), managing instances of SSAs, secure pairing up with SSA's VNFMs and EMs, personalize the SSAs, policy management, integrity assertion, credential management, facilitate clustering of multiple SSAs into a distributed appliance, monitoring of SSAs for failure and remediation. These functions and protocols are described in subsequent chapters.

The NFV Security Monitoring Analytics System performs secure Telemetry acquisition from the NFV system, and can derive threats and anomalies from the telemetry, and expected to initiate security countermeasures and remediation.

The functionality of each of the foregoing components should be implemented within a HISEE (Hardware-based Isolated Secure Execution Environment), with every instantiation identified by its globally unique instance identifier. Unique instance identifier ensures distinct security identity for each instance useful for security protocols endpoints identification, auditability, controls, debug, and others secure system wide capabilities are tracking.

The Security Monitoring system comprises the following logical databases. The NFV Security Monitoring Database (NFV SecM-DB) is a secure database consisting of security data used for deploying NFV system wide Security Monitoring. This includes Security Monitoring policy and configurations, security credentials for facilitating secure communications between the various Security Monitoring components, and credentials for secure storage of telemetry, including tenant-specific security policies. The SSA/VSF Catalog Database (VSF-VNF-CAT) is a repository for Security Services Agents like the Virtual Security Functions (VSF) VNFs. The catalog has capability to add and remove SSAs (VSF) packages and/or images, and also includes a VSF VNFD containing metadata and information about that VSF VNF. Once the SSA (VSF) package or instance is added to the catalog, it becomes available for orchestration. The Audit Database (NFV AUD-DB is a secure database consisting of security audit information.

The Security Monitoring Analytics system securely receives Security Monitoring telemetry from across the NFV systems, including the MANO and all the NFVIs that may be geographically distributed. The analytics system applies advanced machine learning techniques on the telemetry to perform advanced detection of security anomalies and emerging threats in the system. This system also can trigger remediation actions through the NFV SC.

The interfaces between these various components (FIG. 16) will use or extend the interfaces defined by ETSI NFV as necessary for Security Monitoring. When possible, existing interfaces extensions (shown in black) will be used. The new NFV Security Monitoring systems interfaces are shown in dark gray.

There is a Security Monitoring Telemetry Network (shown in Blue), which is used for transmitting protected security monitoring telemetry and traffic (comprising Control, Management and Data packets) from various Security Monitoring Agents to the Security Monitoring Analytics System. This Secure channel will be established using the Security Controller as the trusted 3rd party.

NFV security monitoring and management architecture 1600 includes NFVI 1602 comprising a plurality of compute platforms 1604-1 . . . 1604-n. Generally, a variety of different types of platform hardware architectures may be used for compute platforms 1604-1 . . . 1604-n including single- and multi-socketed servers, micro-servers, blade servers and server modules, etc. For illustrative purposes, each compute platform has a set of hardware components 1606 including a multi-core processor, I/O interfaces and interconnects, one or more NICs, and an optional physical switch. Those skilled in the art will recognize that the hardware for each compute platform will include additional components and interfaces in addition to those shown in FIG. 16, including system memory, memory controllers, peripheral components and/or expansion cards, etc. Also depicted for each compute platform is telemetry data 1608, trust anchors 1610, and storage 1612. In addition, each compute platform includes an NFV SSA physical resource 1613.

Each of compute platforms 1604-1 . . . 1604-n also includes various firmware and software components running on its hardware. The firmware components include a UEFI (Universal Extensible Firmware Interface) BIOS (Basic Input/Output System) 1614. The software components are configured to implement a virtualized execution environment and include a hypervisor 1616, a plurality of VNFs 1618-1 . . . 1618-m, a VSF VNF 1620, a virtual switch/router 1622, and a user data plane library 1624. Hypervisor 1616 includes a virtual switch/router 1626, and an NFV SSA virtual resource 1628. VNF 1618-1 includes an NFV SSA 1630 (implemented as a VNF). VNF 1618-m includes a VNFC implementing a NFV SSA 1634, and a VNFC 1636. VSF VNF includes an NFV SSA 1638. Each compute platform also includes an HISEE 1640.

NFV infrastructure 1602 is configured to interface with various components in a security monitoring telemetry network. These components include a virtual security function VNF catalog 1642, a security monitoring database 1644, an OSS/BSS (Operations and Business Support Systems) system 1646 extended for NFV, an audit database 1648, an NFV security controller 1650, an orchestrator 1652, security monitoring analytics systems 1654, a VNFM 1656, and a VIM 1658. NFVM 1656 includes an NFV Security Services Provider (SSP) 1660 used for VNF analysis. VIM 1658 includes an NFV SSP 1662 configured to support virtualized resource analysis and an NFV SSP 1664 configured to support physical resource analysis.

NFV security monitoring architecture 1600 further includes multiple reference points and interfaces between various blocks/components. These include an Os-Sc reference point, an OS-Ma-nfvo reference point, an Or-Smas reference point, a Ve-vnfm reference point, an Or-vnfm reference point, a SCtl-Vnfm reference point, a rem. Interface (I/F), a SCtrl-Vi reference point, a Vi-Vnfm reference point, an Or-Vi reference point, and an Nf-Vi reference point.

As shown by the legend in FIG. 16, the blocks shown in black with white text correspond to SGX enclaves or physical resources associated with SGX enclaves. The SGX enclaves include NFV SSAs 1630, 1632 and 1638, which are implemented as part of NFV infrastructure 1602, and NFV security controller 1650. Each platform 1604-1 . . . 1604-N further includes NFV SSA physical resources 1613.

Exemplary Platform Implementing Multiple Separate Trust Domains

Figure 17:
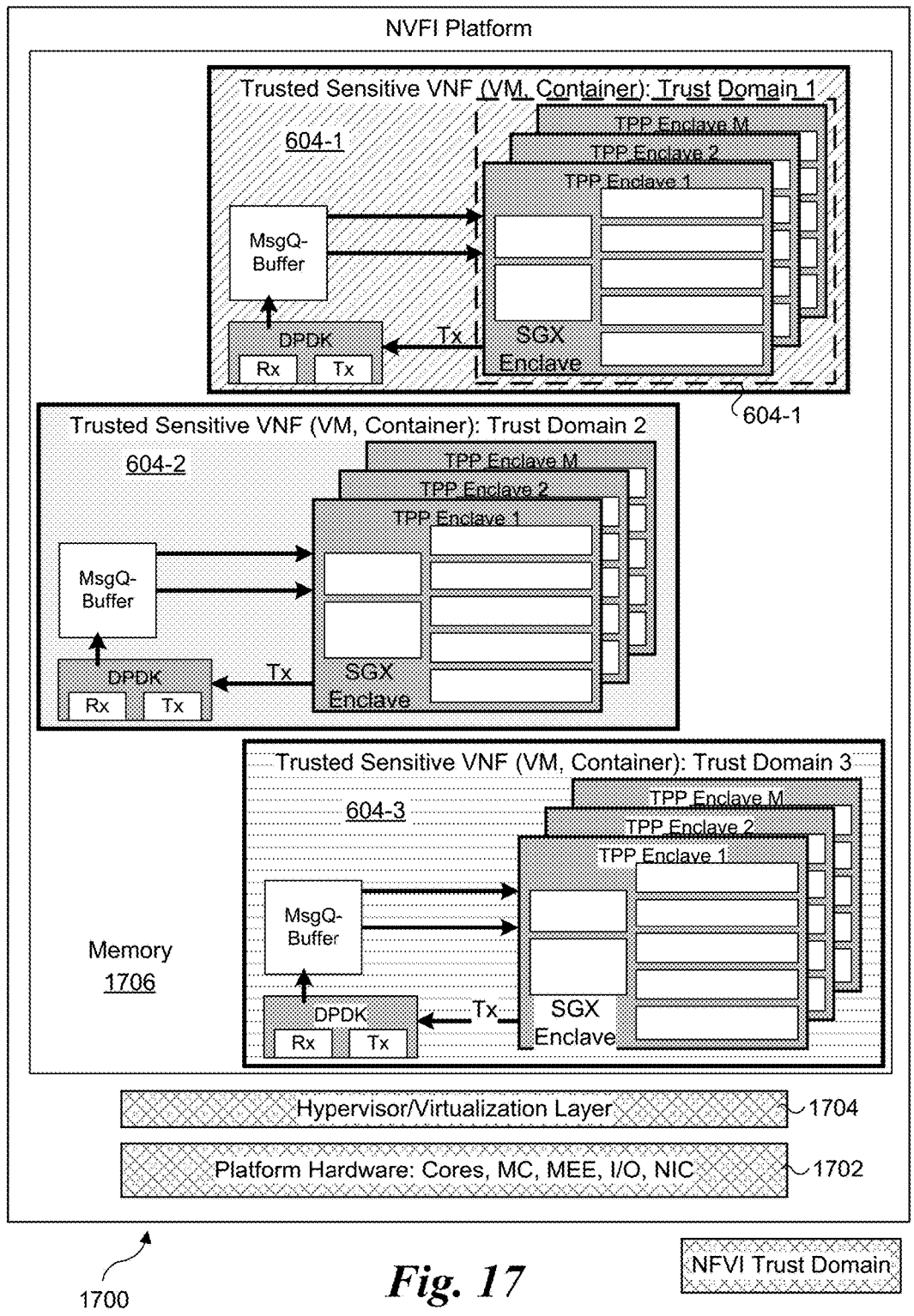
FIG. 17 is a schematic diagram illustrating multiple, separate trust domains being implemented on a single platform.

FIG. 17 illustrates one example of multiple, separate trust domains being implemented on a single platform 1700, which is part of the NVF infrastructure hosted by an NVFI operator. The platform includes platform hardware 1702, which includes the platform's multi-core processor, memory controller (MC), MEE, input/output components and interconnects, and one or more NICs. In the illustrated embodiment, platform 1700 includes a hypervisor/virtualization layer 1704 that is configured to support implementing trusted sensitive VNFs, using either VMs or containers. Various types of virtualization schemes may be deployed, including both Type-1 and Type-2 hypervisors; hypervisor/virtualization layer 1704 is a generic representations of the virtualization scheme and is not limited to any particular type of virtualization scheme. As further depicted, platform hardware 1702 and hypervisor/virtualization layer 1704 are part of an NVFI trust domain. Platform 1700 further includes system memory 1706, which is used for deploying VM and/or containers and tenant software applications that run in the VMs and containers.

Platform 1700 further shows three trusted sensitive VNFs 604-1, 604-2, and 604-3, each being part of separate trust domains 1, 2, and 3, that are resident in memory 1706. The trusted sensitive VNFs are used by tenants that deploy their applications on NVFI compute resources made available by the NVFI provider/administrator. Generally, the NVFI operator may be a third party that leases its NVFI compute resources, such as Amazon (AWS), Microsoft (Azure), etc. The NVFI may also be the same party as one or more of the tenants, as discussed above.

Each trust domain provides a secure execution environment in which software and data contained in the TPP enclaves of the trusted sensitive VNFs cannot be accessed by any other tenant. Moreover, the NVFI provider/administrator cannot access any of the memory in the TPP enclaves, and is even precluded from doing a memory dump or the memory regions in memory 1706 occupied by the TPP enclaves—any attempt to do so will be prevented by the memory controller. Moreover, even if an attempt was made to access memory 1706 by other means (such as physically attempting to access the memory using external electrical equipment), the software and data in the TPP enclaves is encrypted by the MEE and would be undecipherable.

In addition to the secure execution environment of FIG. 16, secure execution environments supporting multiple trust domains may be implemented in various types of equipment and systems, including but not limited to including P-CSCF, S-CSCF, IB-CSCF, MSC, GMSC, HSS, HLR, VLR, SGSN, GGSN, S-GW, PDN-Gateway, IMS-ALG, MME, MFRP, MRFC, SBC, BMSC, BRAS, DSLAM, Local Exchange, Trunk Exchange, AAA Radius functions, SBC, and Border Gateways.

Exemplary Data Center

Aspects of the embodiments disclosed herein may be implemented in data centers. Generally, data centers include a large number of computing resources, commonly referred to as servers, blade servers, server blades, server modules, micro-servers, or more generally compute nodes or compute platforms. The compute nodes are interconnected by various types of networks such as, but not limited to Ethernet and InfiniBand networks. Various networking technologies may also be used, including wired and optical networking equipment.

Figure 18:
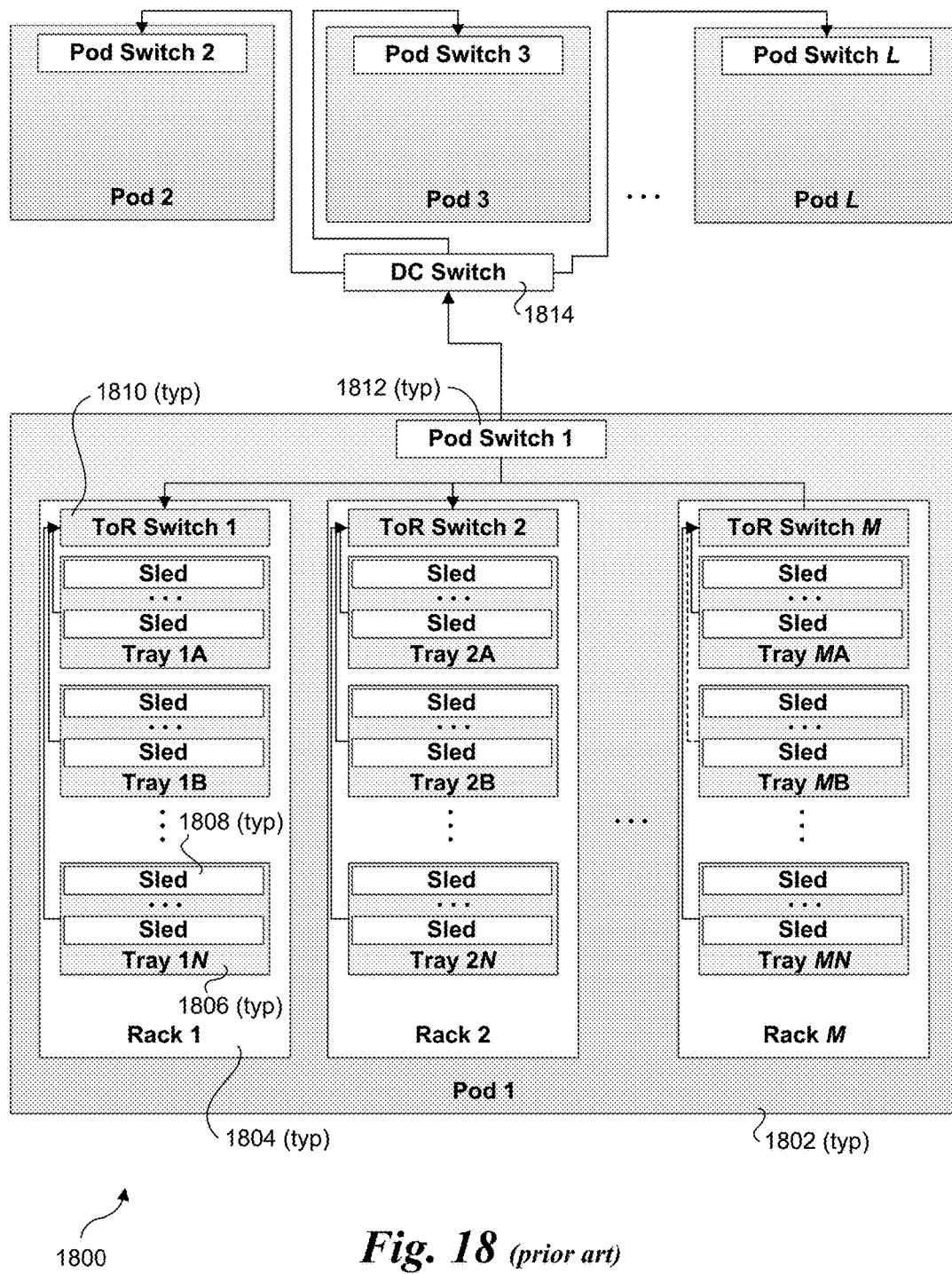
FIG. 18 is a schematic diagram of an exemplary physical rack configuration in a data center.

FIG. 18 shows a portion of a physical hierarchy in an exemplary data center 1800 including a number L of pods 1802, a number M of racks 1804, each of which includes slots for a number N of trays 1806. Each tray 1806, in turn, may include multiple sleds 1808. For convenience of explanation, each of pods 1802, racks 1804, and trays 1806 is labeled with a corresponding identifier, such as Pod 1, Rack 2, Tray 1B, etc. Trays may also be referred to as drawers, and sleds may also have various forms, such as modules and nodes. In addition to tray and sled configurations, racks may be provisioned using chassis in which various forms of servers (compute platforms) are installed, such as blade server chassis and server blades.

Depicted at the top of each rack 1804 is a respective top of rack (ToR) switch 1810, which is also labeled by ToR Switch number. Generally, ToR switches 1810 are representative of both ToR switches and any other switching facilities that support switching between racks 1804. It is conventional practice to refer to these switches as ToR switches whether or not they are physically located at the top of a rack (although they generally are).

Each Pod 1802 further includes a pod switch 1812 to which the pod's ToR switches 1810 are coupled. In turn, pod switches 1812 are coupled to a data center (DC) switch 1814. The data center switches may sit at the top of the data center switch hierarchy, or there may be one or more additional levels that are not shown. For ease of explanation, the hierarchies described herein are physical hierarchies that use physical LANs. In practice, it is common to deploy virtual LANs using underlying physical LAN switching facilities.

Further aspects of the subject matter described herein are set out in the following numbered clauses:

1. A method comprising:

creating at least one secure enclave in system memory of a compute platform configured to support a virtualized execution environment including a plurality of virtual machines (VMs) or containers, each secure enclave occupying a respective protected portion of the system memory, wherein software code external from a secure enclave cannot access code or data within a secure enclave, and software code in a secure enclave can access code and data both within the secure enclave and external to the secure enclave;

installing software code for implementing respective packet processing operations in the at least one secure enclave;

performing packet processing for a plurality of packet flows in parallel via execution of the software code in the at least one secure enclave.

2. The method of clause 1, further comprising:

for each of the at least one secure enclave, creating a secure enclave via execution of software running on the compute platform, wherein creation of the secure enclave includes installing bootstrap software code in the secure enclave;

executing the bootstrap software code in the secure enclave to establish a secure communication channel between the secure enclave and an entity that is external to the compute platform; and transferring software code corresponding to at least one of the plurality of software-based packet processing blocks to the secure enclave from the entity that is external to the compute platform via the secure communication channel.

3. The method of clause 2, further comprising:

for each of the at least one secure enclave, performing an attestation of the secure enclave using a remote attestation process that is facilitated, in part, via execution of the bootstrap software code in the secure enclave;

obtaining at least one key in connection with performing the attestation of the secure enclave; and employing the at least one key to establish the secure communication channel, wherein encrypted data is transferred over the communication channel using a data encryption and decryption processing employing the at least one key.

4. The method of clause 2 or 3, further comprising:

for one or more secure enclaves from among the at least one secure enclave, transferring at least one of software code and data corresponding to a set of one or more policies to the secure enclave via the secure communication channel for the secure enclave.

5. The method of clause 4, wherein the at least one of software code and data corresponding to the set of one or more policies is pushed to the secure enclave from the external entity.

6. The method of any of clauses 2-5, further comprising:

for one or more secure enclaves from among the at least one secure enclave, transferring software code corresponding to one or more algorithms used to perform packet processing via execution of the software code in that secure enclave.

7. The method of clause 6, wherein the software code corresponding to one or more algorithms is pushed to the at least one secure enclave from the external entity.

8. The method of any of clauses 2-7, wherein the entity that is external to the compute platform comprises a management and orchestration system.

9. The method of any of the preceding clauses, wherein a first portion of the plurality of packet flows are processed using packet processing operations comprising a single block of software code, and a second portion of the plurality of packet flows are processed using packet processing operations comprising multiple blocks of software code implemented as service chains.

10. The method of clause 9, wherein at least one service chain includes at least two services that are implemented via execution of respective blocks of software code in at least two secure enclaves.

11. The method of clause 10, wherein the at least two secure enclaves include secure enclaves that are implemented in at least two separate VMs or containers.

12. The method of any of the preceding clauses, further comprising implementing multiple trust domains via use of a plurality of secure enclaves, wherein software executing in one trust domain cannot access memory associated with a secure enclave in any other trust domain from among the multiple trust domains.

13. The method of clause 12, wherein software running in at least one secure enclave in a first trust domain is provided or acquired from a first software vendor or software developer, and software running in at least one secure enclave in a second trusted domain is provided or acquired from a second software vendor or software developer.

14. The method of clause 12 or 13, wherein access to the compute platform is leased from a third party network function virtualization infrastructure (NFVI) provider and the software running in at least one of the multiple trust domains is deployed by a tenant of the NFVI provider, and wherein the NFVI provider cannot access any memory location within any secure enclave in the at least one trust domain.

15. A compute platform, comprising:

system memory;

a processor, operatively coupled to the system memory, having an instruction set including instructions for creating and providing access to secure enclaves implemented in the system memory, wherein software code external to a secure enclave cannot access code or data within a secure enclave, and software code in a secure enclave can access code and data both within the secure enclave and external to the secure enclave; and a plurality of network ports including one or more transmit (Tx) ports and one or more receive (Rx) ports, operatively coupled to the processor, wherein, when operating, the computer platform hosts a virtualized execution environment including a plurality of virtual machines (VMs) or containers, wherein a plurality of secure enclaves are implemented in respective portions of system memory associated with at least one of the plurality of VMs or containers, wherein software code for implementing packet processing operations is installed in the at least one secure enclave;

and wherein during operation of the compute platform the compute platform is configured to, receive packets corresponding to a plurality of packet flows from a network at one or more Rx ports;

perform packet processing for the plurality of packet flows in parallel via execution of the software code in the at least one secure enclave; and transmit packets for which packet processing has been completed outbound to the network via one or more of the Tx ports.

16. The compute platform of clause 15, wherein each of the plurality of secure enclaves is created via execution of software running on the compute platform, wherein creation of the secure enclave includes installing bootstrap software code in the secure enclave;

wherein the bootstrap code in each secure enclave is executed to establish a secure communication channel between the secure enclave and an entity that is external to the compute platform; and wherein software code corresponding to at least one of a plurality of software-based packet processing blocks is transferred to a secure enclave from the entity that is external to the compute platform via the secure communication channel for that secure enclave.

17. The compute platform of clause 16, wherein, for each of the plurality of secure enclaves, an attestation of the secure enclave has been performed using a remote attestation process that is facilitated, in part, via execution of the bootstrap software code in the secure enclave;

wherein at least one key is obtained in connection with performing the attestation of the secure enclave; and wherein the at least one key is employed to establish the secure communication channel for that secure enclave, and wherein encrypted data is transferred over the communication channel using a data encryption and decryption processing employing the at least one key.

18. The compute platform of clause 16 or 17, wherein at least one of the plurality of secure enclaves from among the at least one secure enclaves has installed at least one of software code and data corresponding to one or more policies that has been transferred to the secure enclave via the secure communication channel for the secure enclave.

19. The compute platform of clause 18, wherein the at least one of software code and data corresponding to the one or more policies was pushed to the secure enclave from the external entity via the secure communication channel for the secure enclave.

20. The compute platform of any of clauses 16-19, wherein at least one of the plurality of secure enclaves from among the at least one secure enclaves has software code corresponding to one or more algorithms used to perform packet processing via execution of the software code installed therein.

21. The compute platform of clause 20, wherein the software code corresponding to one or more algorithms is installed in the at least secure enclave by pushing the software code to the secure enclave from the external entity via the secure communication channel for the secure enclave.

22. The compute platform of any of clauses 16-21, wherein the entity that is external to the compute platform comprises a management and orchestration system.

23. The compute platform of any of clauses 16-22, wherein a first portion of the plurality of packet flows are processed using packet processing operations comprising a single block of software code, and a second portion of the plurality of packet flows are processed using packet processing operations comprising multiple blocks of software code implemented as service chains.

24. The compute platform of clause 23, wherein at least one service chain includes respective blocks of software code executing in at least two secure enclaves.

25. The compute platform of clause 24, wherein the at least two secure enclaves include secure enclaves that are implemented in at least two separate VMs or containers.

26. The compute platform of any of clause 15-25, wherein software code for implementing packet processing operations is separated into multiple trust domains, each including at least one secure enclave, and wherein software executing in one trust domain cannot access memory associated with a secure enclave in any other trust domain from among the multiple trust domains.

27. The compute platform of clause 26, wherein software running in at least one secure enclave in a first trust domain is provided or acquired from a first software vendor or software developer, and software running in at least one secure enclave in a second trusted domain is provided or acquired from a second software vendor or software developer.

28. The compute platform of clause 26 or 27, wherein access to the compute platform is leased from a third party network function virtualization infrastructure (NFVI) provider and the software running in at least one of the multiple trust domains is deployed by a tenant of the NFVI provider, and wherein the NFVI provider cannot access any memory location within any secure enclave in the at least one trust domain.

29. A method for performing packet processing in a data center environment including a plurality of compute platforms interconnected by one or more networks, comprising:
for each of multiple compute platforms from among the plurality of compute platforms configured to support a virtualized execution environment including a plurality of virtual machines (VMs) or containers,
creating at least one secure enclave in system memory of the compute platform, each secure enclave occupying a respective protected portion of the system memory, wherein software code external from a secure enclave cannot access code or data within a secure enclave, and software code in a secure enclave can access code and data both within the secure enclave and external to the secure enclave;
installing software code for implementing respective packet processing operations in the at least one secure enclave;
performing packet processing for a plurality of packet flows via execution of the software code in the a plurality of the secure enclaves, wherein packet processing operations for at least one packet flow include a service chain implemented via execution of software code installed in at least secure enclaves on at least two of the compute platforms.

30. The method of clause 29, further comprising:
for each of the at least one secure enclave in at least one of the multiple compute platforms,
creating a secure enclave via execution of software running on the compute platform, wherein creation of the secure enclave includes installing bootstrap software code in the secure enclave;
executing the bootstrap software code in the secure enclave to establish a secure communication channel between the secure enclave and an entity that is external to the compute platform; and
transferring software code corresponding to at least one of the plurality of software-based packet processing blocks to the secure enclave from the entity that is external to the compute platform via the secure communication channel.

31. The method of clause 30, further comprising:
for each of the at least one secure enclave in at least one of the multiple compute platforms,
performing an attestation of the secure enclave using a remote attestation process that is facilitated, in part, via execution of the bootstrap software code in the secure enclave;
obtaining at least one key in connection with performing the attestation of the secure enclave; and
employing the at least one key to establish the secure communication channel, wherein encrypted data is transferred over the communication channel using a data encryption and decryption processing employing the at least one key.

32. The method of clause 30 or 31, further comprising:
for at least one secure enclave from among the at least one secure enclaves in at least one of the multiple compute platforms,
transferring at least one of software code and data corresponding to a set of one or more policies to the secure enclave via the secure communication channel for the secure enclave.

33. The method of clause 32, wherein the at least one of software code and data corresponding to the set of one or more policies is pushed to the secure enclave from the external entity.

34. The method of any of clauses 30-33, wherein the entity that is external to the compute platform comprises a management and orchestration system.

35. The method of clause 34, wherein software code running in at least two respective secure enclaves is acquired or provided from at least two software vendors.

36. The method of any of clauses 29-35, wherein the service chain includes multiple operations, and at least a portion of the operations relate to security monitoring.

37. The method of clause 36, wherein the data center environment includes physical components and infrastructure configured to implement security monitoring in accordance with an ETSI (European Telecommunications Standards Institute) Network Function Virtualization (NFV) Specification on Security Monitoring.

38. The method of any of clauses 29-37, wherein a first portion of the plurality of packet flows are processed using packet processing operations comprising a single block of software code, and a second portion of the plurality of packet flows are processed using packet processing operations comprising multiple blocks of software code implemented as service chains.

39. The method of any of clauses 29-38, wherein at least one service chain includes respective blocks of software code executing in at least two secure enclaves that are implemented in at least two separate VMs or containers.

40. The method of clause 39, wherein the at least two secure enclaves include secure enclaves that are implemented in at least two separate VMs or containers.

41. The method of any of clauses 29-40, wherein the service chain is implemented via execution of software code installed in at least secure enclaves on at least two of the compute platforms.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
creating at least one secure enclave in system memory of a compute platform configured to support a virtualized execution environment including a plurality of virtual machines (VMs) or containers, each secure enclave occupying a respective protected portion of the system memory, wherein software code external from a secure enclave cannot access code or data within a secure enclave, and software code in a secure enclave can access code and data both within the secure enclave and external to the secure enclave;
installing software code for implementing respective packet processing operations in the at least one secure enclave;
performing packet processing for a plurality of packet flows in parallel via execution of the software code in the at least one secure enclave.

2. The method of claim 1, further comprising:
for each of the at least one secure enclave,
creating a secure enclave via execution of software running on the compute platform, wherein creation of the secure enclave includes installing bootstrap software code in the secure enclave;
executing the bootstrap software code in the secure enclave to establish a secure communication channel between the secure enclave and an entity that is external to the compute platform; and
transferring software code for performing at least one of the respective packet processing operations to the secure enclave from the entity that is external to the compute platform via the secure communication channel.

3. The method of claim 2, further comprising:
for each of the at least one secure enclave,
performing an attestation of the secure enclave using a remote attestation process that is facilitated, in part, via execution of the bootstrap software code in the secure enclave;
obtaining at least one key in connection with performing the attestation of the secure enclave; and
employing the at least one key to establish the secure communication channel, wherein encrypted data is transferred over the communication channel using a data encryption and decryption processing employing the at least one key.

4. The method of claim 2, further comprising:
for one or more secure enclaves from among the at least one secure enclave,
transferring at least one of software code and data corresponding to a set of one or more policies to the secure enclave via the secure communication channel for the secure enclave.

5. The method of claim 4, wherein the at least one of software code and data corresponding to the set of one or more policies is pushed to the secure enclave from the external entity.

6. The method of claim 2, further comprising:
for one or more secure enclaves from among the at least one secure enclave,
transferring software code corresponding to one or more algorithms used to perform packet processing via execution of the software code in that secure enclave.

7. The method of claim 6, wherein the software code corresponding to one or more algorithms is pushed to the at least one secure enclave from the external entity.

8. The method of claim 2, wherein the entity that is external to the compute platform comprises a management and orchestration system.

9. The method of claim 1, wherein a first portion of the plurality of packet flows are processed using packet processing operations comprising a single block of software code, and a second portion of the plurality of packet flows are processed using packet processing operations comprising multiple blocks of software code implemented as service chains.

10. The method of claim 9, wherein at least one service chain includes at least two services that are implemented via execution of respective blocks of software code in at least two secure enclaves.

11. The method of claim 10, wherein the at least two secure enclaves include secure enclaves that are implemented in at least two separate VMs or containers.

12. The method of claim 1, further comprising implementing multiple trust domains via use of a plurality of secure enclaves, wherein software executing in one trust domain cannot access memory associated with a secure enclave in any other trust domain from among the multiple trust domains.

13. The method of claim 1, further comprising configuring at least one of the plurality of VMs or containers as a virtual network function (VNF) component in which one or more secure enclaves are implemented as a trusted packet processing enclave.

14. A method for performing packet processing in a data center environment including a plurality of compute platforms interconnected by one or more networks, comprising:
for each of multiple compute platforms from among the plurality of compute platforms configured to support a virtualized execution environment including a plurality of virtual machines (VMs) or containers,
creating at least one secure enclave in system memory of the compute platform, each secure enclave occupying a respective protected portion of the system memory, wherein software code external from a secure enclave cannot access code or data within a secure enclave, and software code in a secure enclave can access code and data both within the secure enclave and external to the secure enclave;
installing software code for implementing respective packet processing operations in the at least one secure enclave;
performing packet processing for a plurality of packet flows via execution of the software code in a plurality of the secure enclaves, wherein packet processing operations for at least one packet flow include a service chain implemented via execution of software code installed in secure enclaves on at least two of the compute platforms.

15. The method of claim 14, further comprising:
for each of the at least one secure enclave in at least one of the multiple compute platforms, creating a secure enclave via execution of software running on the compute platform, wherein creation of the secure enclave includes installing bootstrap software code in the secure enclave;

executing the bootstrap software code in the secure enclave to establish a secure communication channel between the secure enclave and an entity that is external to the compute platform; and transferring software code for performing at least one of the respective packet processing operations to the secure enclave from the entity that is external to the compute platform via the secure communication channel.

16. The method of claim 15, further comprising:
for each of the at least one secure enclave in at least one of the multiple compute platforms,
performing an attestation of the secure enclave using a remote attestation process that is facilitated, in part, via execution of the bootstrap software code in the secure enclave;
obtaining at least one key in connection with performing the attestation of the secure enclave; and
employing the at least one key to establish the secure communication channel, wherein encrypted data is transferred over the communication channel using a data encryption and decryption processing employing the at least one key.

17. The method of claim 15, further comprising:
for at least one secure enclave from among the at least one secure enclaves in at least one of the multiple compute platforms,
transferring at least one of software code and data corresponding to a set of one or more policies to the secure enclave via the secure communication channel for the secure enclave.

18. The method of claim 17, wherein the at least one of software code and data corresponding to the set of one or more policies is pushed to the secure enclave from the external entity.

19. The method of claim 18, wherein software code running in at least two respective secure enclaves is acquired or provided from at least two software vendors.

20. The method of claim 14, wherein the data center environment includes physical components and infrastructure configured to implement security monitoring in accordance with an ETSI (European Telecommunications Standards Institute) Network Function Virtualization (NFV) Specification on Security Monitoring.

21. The method of claim 14, further comprising configuring at least one of the plurality of VMs or containers as a virtual network function (VNF) component in which one or more secure enclaves are implemented as a trusted packet processing enclave.

* * * * *